(12) United States Patent
Schulz

(10) Patent No.: US 7,009,963 B1
(45) Date of Patent: Mar. 7, 2006

(54) DUAL OPTIMALITY FOR DIFFERENT DATA RATE BACKPLANE TRANSFER

(75) Inventor: Jeff Schulz, Valencia, PA (US)

(73) Assignee: Marconi Intellectual Property (Ringfence), Inc., Warrendale, PA (US)

( * ) Notice: Subject to any disclaimer, the term of this patent is extended or adjusted under 35 U.S.C. 154(b) by 668 days.

(21) Appl. No.: 09/686,768

(22) Filed: Oct. 11, 2000

(51) Int. Cl.
*H04L 12/26* (2006.01)
*H04J 3/14* (2006.01)
*G08C 15/00* (2006.01)
*G06F 11/00* (2006.01)
*G06F 15/16* (2006.01)

(52) U.S. Cl. .................. 370/359; 370/225; 370/236; 709/235

(58) Field of Classification Search ........ 370/225–236, 370/325, 351–392, 412–429, 503–509, 356–395, 370/402, 413–465, 328–345; 709/223–235; 714/757–800
See application file for complete search history.

(56) References Cited

U.S. PATENT DOCUMENTS

| | | | | |
|---|---|---|---|---|
| 5,040,170 A * | 8/1991 | Upp et al. .................. | 370/358 |
| 5,526,352 A * | 6/1996 | Min et al. ................. | 370/395.4 |
| 5,581,566 A * | 12/1996 | St. John et al. ............. | 714/757 |
| 5,983,278 A * | 11/1999 | Chong et al. ............... | 709/235 |
| 5,987,008 A * | 11/1999 | Simpson et al. ............ | 370/236 |
| 6,034,954 A * | 3/2000 | Takase et al. ............... | 370/362 |
| 6,128,292 A * | 10/2000 | Kim et al. .................. | 370/356 |
| 6,201,789 B1 * | 3/2001 | Witkowski et al. ......... | 370/230 |
| 6,215,772 B1 * | 4/2001 | Verma ........................ | 370/236 |
| 6,275,508 B1 * | 8/2001 | Aggarwal et al. .......... | 370/503 |
| 6,359,893 B1 * | 3/2002 | Mills .......................... | 370/402 |
| 6,392,992 B1 * | 5/2002 | Phelps ........................ | 370/225 |
| 6,459,700 B1 * | 10/2002 | Hoang ........................ | 370/401 |
| 6,463,063 B1 * | 10/2002 | Bianchini, Jr. et al. ..... | 370/395 |
| 6,473,433 B1 * | 10/2002 | Bianchini, Jr. et al. ..... | 370/412 |
| 6,473,435 B1 * | 10/2002 | Zhou et al. ................. | 370/428 |
| 6,496,519 B1 * | 12/2002 | Russell et al. .............. | 370/465 |
| 6,526,021 B1 * | 2/2003 | Dempsey .................... | 370/227 |
| 6,526,024 B1 * | 2/2003 | Spagnolo et al. ........... | 370/236 |
| 6,556,589 B1 * | 4/2003 | McRobert et al. .......... | 370/501 |
| 6,618,392 B1 * | 9/2003 | Bray ........................... | 370/465 |
| 6,654,370 B1 * | 11/2003 | Quirke et al. ............... | 370/389 |
| 6,687,247 B1 * | 2/2004 | Wilford et al. ............. | 370/392 |
| 6,816,505 B1 * | 11/2004 | Sutardja et al. ............. | 370/463 |

* cited by examiner

*Primary Examiner*—M. Phan
(74) *Attorney, Agent, or Firm*—Ansel M. Schwartz

(57) ABSTRACT

A switch of a network for switching data. The switch includes a fabric for switching the data. The switch includes a connection mechanism connected to the fabric for providing data to and from the fabric. The switch includes a first port card which receives data at a first rate from the network or sends data at the first rate to the network. The first port card is connected to the connection mechanism to send data to or receive the data from the fabric at a connection rate. The switch includes a second port card which receives data at a second rate from the network or sends data at the second rate to the network. The second port card is connected to the connection mechanism to send data to or receive data from the fabric at the connection rate. The second port card separates the data received at the second rate into streams of data that together equal the data received at the second port card that are sent concurrently at the connection rate to the fabric and combine the data streams received at the connection rate into data that is sent at the second rate to the network. A method for switching data in a network.

23 Claims, 2 Drawing Sheets

DUAL OPTIMALITY FOR DIFFERENT DATA RATE BACKPLANE TRANSFER

RELATED APPLICATIONS

U.S. patent application Ser. No. 09/609,177 titled "Backplane Synchronization in a Distributed System with Clock Drift and Transport Delay", now U.S. Pat. No. 6,654,370; Ser. No. 09/609,497 titled "Queue Resynch: Synchronous Real-Time Upgrade of a Distributed Switching System", now U.S. Pat. No. 6,473,433; Ser. No. 09/627,924 titled "Synchronous Dynamic Register Updating Across a Distributed System"; Ser. No. 09/293,563 titled "Very Wide Memory TDM Switching System"; Ser. No. 09/333,450 titled "Data Striping Based Switching System"; and contemporaneously filed U.S. patent application Ser. No. 09/686,539 titled "Parity Exchange", all of which are incorporated by reference herein.

FIELD OF THE INVENTION

The present invention is related to the transfer of data of connections at various rates across a same backplane of a switch. More specifically, the present invention is related to the transfer of data of connections at various rates across the same backplane of the switch by dividing the higher data rate connections into data pipes having the same rate as the data pipes formed from the lower rate connections.

BACKGROUND OF THE INVENTION

In a switch which stripes data to a variable number of fabrics, a different physical bus topology is used if the speed of the input port changes. The mapping of the bits onto the backplane busses needs to maintain the following properties:
  a. Optimal bandwidth utilization of the busses for all operating speeds (OC48 and OC192).
  b. Support OC48/OC192 interoperability.
  c. Utilize the same physical backplane busses for all speeds of operation.

The present invention allows a design to be optimized for both OC48 and OC192 while maintaining compatibility between the two port speeds on the backplane. This allows one backplane design to support exchanging traffic between OC48 and OC192 ports.

SUMMARY OF THE INVENTION

The present invention pertains to a switch of a network for switching data. The switch comprises a fabric for switching the data. The switch comprises a connection mechanism connected to the fabric for providing data to and from the fabric. The switch comprises a first port card which receives data at a first rate from the network or sends data at the first rate to the network. The first port card is connected to the connection mechanism to send data to or receive the data from the fabric at a connection rate. The switch comprises a second port card which receives data at a second rate from the network or sends data at the second rate to the network. The second port card is connected to the connection mechanism to send data to or receive data from the fabric at the connection rate. The second port card separates the data received at the second rate into streams of data that together equal the data received at the second port card that are sent concurrently at the connection rate to the fabric and combine the data streams received at the connection rate into data that is sent at the second rate to the network.

The present invention pertains to a method for switching data in a network. The method comprises the steps of receiving data at a first rate from the network at a first port card of a switch. Then there is the step of receiving data at a second rate from the network at a second port card of the switch. Next there is the step of sending data from the first port card to a fabric of the switch to a connection mechanism of the switch at a connection rate. Then there is the step of separating the data received at the second rate at the second port card into streams of data that together equal the data received at the second port card. Next there is the step of sending concurrently at the connection rate to the fabric from the second port card the stream of data along the connection mechanism.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
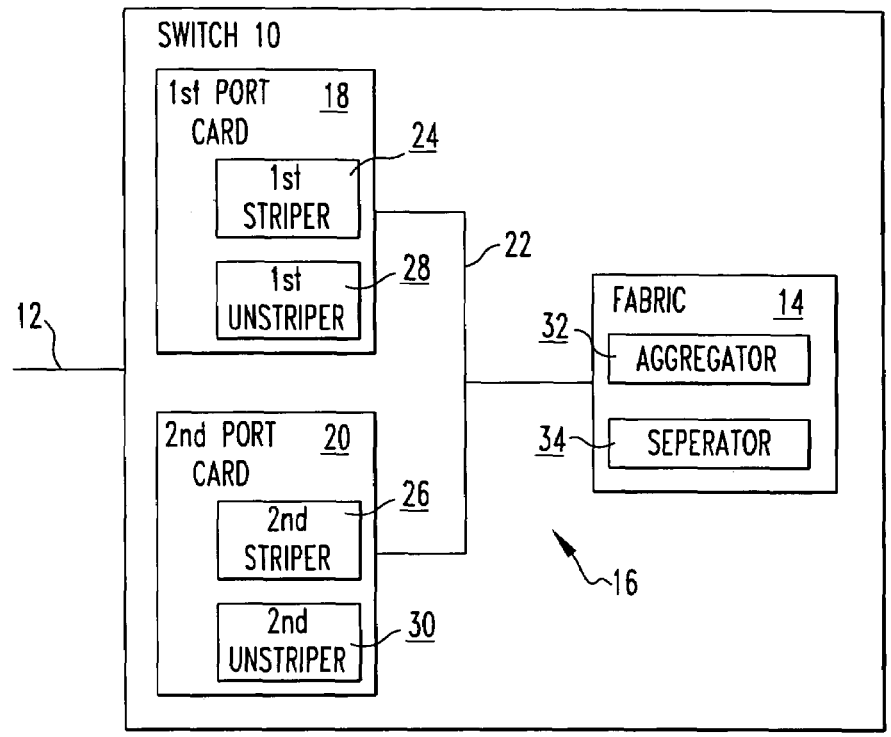
FIG. 1 is a schematic representation of the switch of the present invention.

Referring now to the drawings wherein like reference numerals refer to similar or identical parts throughout the several views, and more specifically to FIG. 1 thereof, there is shown a switch 10 of a network 12 for switching data. The switch 10 comprises a fabric 14 for switching the data. The switch 10 comprises a connection mechanism 16 connected to the fabric 14 for providing data to and from the fabric 14. The switch 10 comprises a first port card 18 which receives data at a first rate from the network 12 or sends data at the first rate to the network 12. The first port card 18 is connected to the connection mechanism 16 to send data to or receive the data from the fabric 14 at a connection rate. The switch 10 comprises a second port card 20 which receives data at a second rate from the network 12 or sends data at the second rate to the network 12. The second port card 20 is connected to the connection mechanism 16 to send data to or receive data from the fabric 14 at the connection rate. The second port card 20 separates the data received at the second rate into streams of data that together equal the data received at the second port card 20 that are sent concurrently at the connection rate to the fabric 14 and combine the data streams received at the connection rate into data that is sent at the second rate to the network 12.

Preferably, the connection rate equals the first rate and the second rate is equal to N times the first rate, where N is an integer greater than or equal to 2, and there are N streams. The connection mechanism 16 preferably includes a backplane bus 22 that connects the first port card 18 and the second port card 20 to the fabric 14.

Preferably, the second port card 20 maps the data received at the second rate onto the bus 22 in interleaved fashion. The second port card 20 preferably maps the data received at the second rate onto the bus 22 in 4 bit interleaved fashion, and N equals 4. Preferably, the first port card 18 has a first striper 24 which takes the data it receives and sends it on the backplane as an OC48 data pipe to the fabric 14, and the second port card 20 has a second striper 26 which takes the data it receives and sends it as 4 OC48 data pipes to the fabric 14. The first port card 18 preferably has a first unstriper 28 which receives data from the fabric 14 on an OC48 data pipe and the second port card 20 has a second unstriper 30 which receives data from the fabric 14 on 4 OC48 data pipes and concatenates the 4 OC48 data pipes to form 1 wide data bus 22 to send the data as OC192 data to the network 12.

Preferably, the first and second striper 26 stripe data they receive on a 48 bit basis to the fabric 14. The first and second stripers 24, 26 preferably stripe data so the data does not exceed a 12 bit boundary. Preferably, the fabric 14 has an aggregator 32 which receives data from the first and second stripers 24, 26, and a separator 34 which sends data from the fabric 14 to the first unstriper 28 and the second unstriper 30.

The present invention pertains to a method for switching data in a network 12. The method comprises the steps of receiving data at a first rate from the network 12 at a first port card 18 of a switch 10. Then there is the step of receiving data at a second rate from the network 12 at a second port card 20 of the switch 10. Next there is the step of sending data from the first port card 18 to a fabric 14 of the switch 10 to a connection mechanism 16 of the switch 10 at a connection rate. Then there is the step of separating the data received at the second rate at the second port card 20 into streams of data that together equal the data received at the second port card 20. Next there is the step of sending concurrently at the connection rate to the fabric 14 from the second port card 20 the stream of data along the connection mechanism 16.

Preferably, the connection rate equals the first rate and the second rate is equal to N times the first rate, where N is an integer greater than or equal to 2, and there are N streams. The connection mechanism 16 preferably includes a backplane bus 22 that connects the first port card 18 and the second port card 20 to the fabric 14. Preferably, the sending concurrently step includes the step of mapping with the second port card 20 the data received at the second rate onto the bus 22 in interleaved fashion.

The mapping step preferably includes the step of mapping with the second port card 20 the data received at the second rate onto the bus 22 in 4 bit interleaved fashion, and N equals 4. Preferably, the first port card 18 has a first striper 24 and the second port card 20 has a second striper 26, and wherein the sending data from the first port card 18 step includes the step of sending the data on the backplane bus 22 with the first striper 24 as an OC482 data pipe to the fabric 14 and the mapping step includes the step of sending the data received by the second striper 26 as 4 OC48 data pipes on the backplane bus 22 to the fabric 14.

data from the fabric 14 on 4 OC48 data pipes at the second port card 20, and concatenating the 4 OC48 data pipes to form 1 wide data bus 22 to send the data as OC192 data to the network 12 by the second port card 20.

Preferably, the first port card 18 sending step includes the step of striping data with the first striper 24 on a 48 bit basis to the fabric 14, and the second port card 20 sending step includes the step of striping data with the second striper 26 on a 48 bit basis to the fabric 14 through the bus 22. The first striper 24 sending step preferably includes the step of striping data to the fabric 14 through the bus 22 so the data does not exceed a 12 bit boundary, and the second striper 26 sending step includes the step of striping data to the fabric 14 through the bus 22 so the data does not exceed a 12 bit boundary.

In the operation of the invention, the striping function for the Switch chipset is implemented as a series of OC48 data pipes. The combination of 4 data pipes in parallel is used to support OC192 operation using the same interconnection between the port card and the fabrics.

This is accomplished by the following:
  a. For OC192 operation, the data is mapped on backplane busses in a bit-interleaved fashion.
  b. For OC192 operation, the receiver of the data concatenates 4 data busses together to form one wide data bus 22. The exact order of the receive operation depends on the destination number.
  c. The transmitter maps the same data bits for both OC48 and OC192 to the same physical backplane busses, except that the data is interleaved on the busses to allow for (b) above. This mapping is designed to be optimal for both port speeds simultaneously (no extra bus bandwidth is wasted).

The exact striping function was developed to support 2 different simultaneous optimizations:
  1. No data can cross a 12 bit boundary. This ensured that OC48 traffic was optimized. Within each 12 bit block, the same number of bits must be sent to all fabrics.
  2. All data on a mod 4 basis in a 48 bit frame must have an even number of bits distributed to each fabric.

Since 12 is a factor of 48, the striping function is defined on a 48 bit basis. Implementation of striping is accomplished by viewing incoming data in 48 bit blocks and then applying the striping function. Within the 48 bit block, 4 separate functions are defined for each of the 12 bit blocks.

An example distribution is shown in the table below for 3 fabric striping.

The following table gives the fabric assignments for each block of 48 bits for 3 fabrics.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F0a(1) | F1a(1) | F2a(1) | F0a(2) | F1a(2) | F2a(2) | F0a(3) | F1a(3) | F2a(3) |
| Bit | 1 | 5 | 9 | 13 | 17 | 21 | 25 | 29 | 33 | 37 | 41 | 45 |
| BP bus | F2b(0) | F0b(0) | F1b(0) | F2b(1) | F0b(1) | F1b(1) | F2b(2) | F0b(2) | F1b(2) | F2b(3) | F0b(3) | F1b(3) |
| Bit | 2 | 6 | 10 | 14 | 18 | 22 | 26 | 30 | 34 | 38 | 42 | 46 |
| BP bus | F1c(0) | F2c(0) | F0c(0) | F1c(1) | F2c(1) | F0c(1) | F1c(2) | F2c(2) | F0c(2) | F1c(3) | F2c(3) | F0c(3) |
| Bit | 3 | 7 | 11 | 15 | 19 | 23 | 27 | 31 | 35 | 39 | 43 | 47 |
| BP bus | F0d(0) | F1d(0) | F2d(0) | F0d(1) | F1d(1) | F2d(1) | F0d(2) | F1d(2) | F2d(2) | F0d(3) | F1d(3) | F2d(3) |

The first port card 18 preferably has a first unstriper 28 and the second port card 20 has a second unstriper 30, and including after the sending the data by the second striper 26 step, there are the steps and of receiving data from the fabric 14 on an OC48 data pipe at the first port card 18, receiving Note that it is impossible to have the same fabric number in a column of the table and maintain optimization number 1 if the number of fabrics is greater than 3. The general striping function is based on the table and starts at fabric zero for bit zero. Moving down a column is a regular pattern of decrements to the fabric number (mod number of fabrics) including from the ending fabric to the starting fabric. This pattern is given in the table below:

| Number of fabrics | Sequence of column zero |
|---|---|
| 1 | 1, 1, 1, 1 |
| 2 | 1, 2, 1, 2 |
| 3 | 1, 3, 2, 1 |
| 4 | 1, 4, 3, 2 |
| 6 | 1, 6, 4, 3 |
| 12 | 1, 10, 7, 4 |

Each row in the table transmits onto a fixed set of backplane busses for OC192 operation, designated A, B, C, D. The data for a given fabric (say fabric 2 of the example above) has a differing ordering of relative bit order between the A, B, C and D channels than fabric 1. However, this ordering is constant for a given striping function, so the receiver chooses bits from the four channels based on the fabric number it is. For the 3 fabric striping this is shown in the table below.

The next table gives the interface read order for the aggregator 32.

| Fabric | 1st | 2nd | 3rd | 4th |
|---|---|---|---|---|
| 0 | A | D | B | C |
| 1 | C | A | D | B |
| 2 | B | C | A | D |

Figure 2:
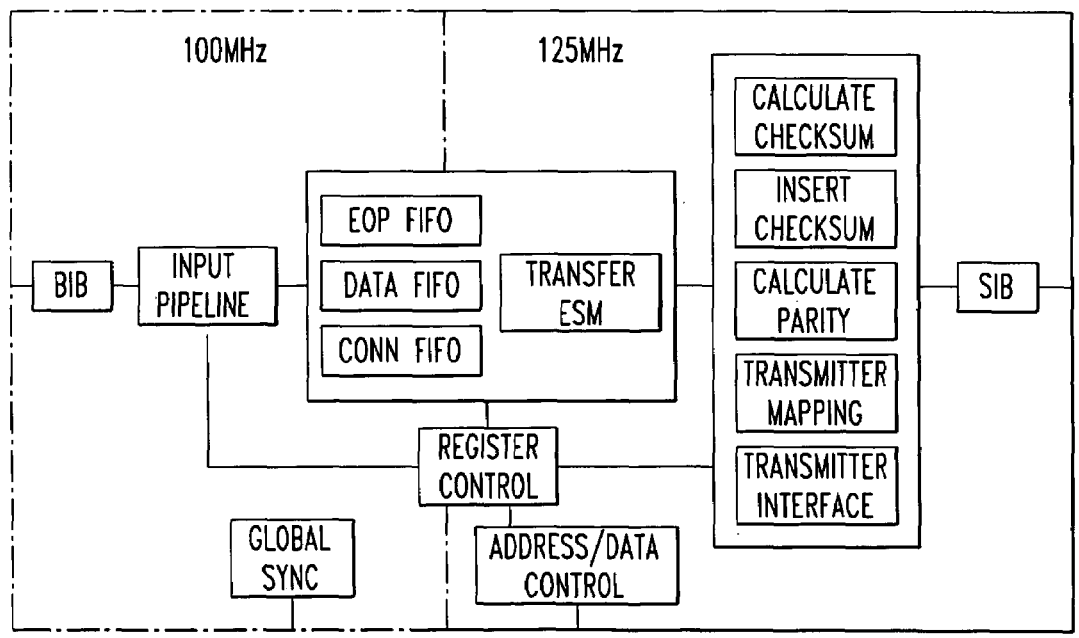
FIG. 2 is a schematic representation of the striper of the present invention.

The structure of the striper is shown in FIG. 2.

The Input Pipeline is the interface to the Switch Input Bus (BIB). In OC192c mode the connection number is resolved so that each Striper has a copy of the connection number when it is not provided by the external connection number bus 22.

The Data FIFO is written at the BIB clock rate and read at the Striped Input Bus (SIB) clock rate. This FIFO is 1536×32-bits. The purpose of this FIFO is to hold the BIB data until it can be transmitted.

The Connection Number FIFO is written at the BIB clock rate and read at the SIB clock rate. This FIFO is 128×26-bits. This FIFO contains the 26 bit connection number that was either provided through the BIB data bus or the External Connection Number bus.

The EOP FIFO is a special FIFO of 128×11-bits. The purpose of this block is to store information about each received cell and packet that is then used to format the data for transmission. The EOP FIFO is also where large packets are split into fragments to allow the buffer to be emptied without having to wait for the entire packet to be received.

The Transfer FSM is responsible for moving the data from the Data FIFO to the Output Pipeline. The Transfer FSM is the point where Internal Cell Buffer (ICB) transmission occurs. The Transfer FSM does the conversion of 4-byte data to two (2) 12-bit busses. Two busses are used to increase the bandwidth of the backplane from 125 MHz to 250 MHz. The Transfer FSM also converts packets that are shorter than the minimum transfer size into a Short Packet.

The Checksum Generation block calculates the CRC-16 checksum for the entire cell or packet.

The Checksum Insertion block inserts the checksum as the last two bytes of a cell or packet. If the packet was fragmented the checksum is only inserted at the end of the last fragment.

The Parity Calculation block generates the per cycle parity. The parity calculation is based on the number of fabrics that are being used. In OC192c mode parity calculations may require the exchange of either data or parity bits in order to be successfully generated. This block will ensure the parity exchanged is relevant to the appropriate cycle of data.

The Fabric Mapping (Striping) block maps the data onto each fabric in the switch 10. Fabric mapping changes can only occur on cell/packet boundaries.

The Transmitter Mapping block puts the striped data onto transmitters according to the number of fabrics configured.

The Register Control block manages the registers and their side-effects within the Striper ASIC.

The Address/Data Bus block implements the external interface to the AD bus 22. This block is common to all ASICs in the Switch 10 and is provided.

The Global Synchronization block calculates the number of clock cycles of lockdown necessary for the chip to compensate for clock drift. This block is common to all ASICs in the switch 10 and is provided.

The following table gives the I/O definition for the chip. The DIR column indicates a port is either an input (I), output (O), bidirect (B—multi-source), or input/output (I/O—depends on striper Id in OC192c mode).

| Name | Dir | Pins | Function |
|---|---|---|---|
| BIB_CLK | I | 1 | Input clock |
| BIB_Data | I | 32 | Output data to DIN bus |
| BIB_EOP | I | 5 | Tag bits for input words. |
| BIB_CELL_PKT | I | 1 | Indicates cell or packet transfer. |
| BIB_SOC | I | 2 | EOP for DIN bus. |
| BIB_CONN | I/O | 26 | Either input connection number for BIB or internal connection number exchange |
| BIB_CONN_EN | I | 1 | Enable use of external connection number bus |
| BIB_BP | O | 1 | BIB backpressure signal from striper |
| BIB_valid | I | 1 | Input indicating BIB data is valid. |
| BP_XMIT0 | O | 10 | Output data to Gigabit serializer Channel 0 |
| BP_XMIT1 | O | 10 | Output data to Gigabit serializer Channel 0 |
| BP_XMIT2 | O | 10 | Output data to Gigabit serializer Channel 0 |
| BP_XMIT3 | O | 10 | Output data to Gigabit serializer Channel 0 |
| BP_XMIT4 | O | 10 | Output data to Gigabit serializer Channel 0 |

-continued

| Name | Dir | Pins | Function |
|---|---|---|---|
| BP_XMIT5 | O | 10 | Output data to Gigabit serializer Channel 0 |
| BP_XMIT6 | O | 10 | Output data to Gigabit serializer Channel 0 |
| BP_XMIT7 | O | 10 | Output data to Gigabit serializer Channel 0 |
| BP_XMIT8 | O | 10 | Output data to Gigabit serializer Channel 0 |
| BP_XMIT9 | O | 10 | Output data to Gigabit serializer Channel 0 |
| BP_XMIT10 | O | 10 | Output data to Gigabit serializer Channel 0 |
| BP_XMIT11 | O | 10 | Output data to Gigabit serializer Channel 0 |
| BP_XMIT12 | O | 10 | Output data to Gigabit serializer Channel 0 |
| BP_XMIT13 | O | 10 | Output data to Gigabit serializer Channel 0 |
| Board_active_I | I | 1 | Signal to enable/terminate backplane transfers |
| AD_DATA | B | 8 | Separate AD bus data bus |
| AD_RDY_L | O | 1 | Indicates transaction complete |
| AD_SEL_L | I | 1 | AD bus chip select |
| AD_CLK | I | 1 | AD bus clock |
| AD_RW | I | 1 | AD bus read/write select. |
| CLOCK125 | I | 1 | Clock used by internal operations (125 MHz) |
| RESET_L | I | 1 | Resets the chip-asynch signal |
| PLL |  | 5 | I/O for internal PLL |
| Chip_mode | I | 3 | Mode (oc48/oc192) and chipid for OC192 |
| JTDO | O | 1 | JTAG test data out |
| JTDI | I | 1 | JTAD test data in |
| JTMS | I | 1 | JTAG test mode select |
| JTCLK | I | 1 | JTAG test clock |
| JTRST | I | 1 | JTAG test reset |
| Global_sync | I | 1 |  |
| MASTER_lockdown_valid | I/O | 1 | Indicates OC192c master controlled lockdown |
| MASTER_synch_valid | I/O | 1 | Indicates OC192c master controlled sync cycle |
| OC192 parity exchange in | I | 14 | Parity data received from other Stripers |
| OC192 parity exchange out | O | 14 | Parity data sent to other Stripers |
| OC192 SOP/#fab/end | I/O | 5 | controls sequencing of OC192 ops |
| SYNC_CONTROL | I/O | 2 | Controls lockdown to the slave Stripers |
| ICB_CONTROL | I/O | 2 | Controls the ICB trap/transmit of the slave Stripers |
| INT_L | O | 1 | Interrupt |
| UNS_BP | I | 1 | Unstriper backpressure |
| SCAN_EN_L | I | 0 | scan enable pin |
| Total |  | 280 |  |

Chip mode is a 3-bit bus. It has the following signals.

| Chip mode bit | Label | Function |
|---|---|---|
| 2 | Mode | Tie to a one for OC192, zero for an OC48. |
| 1:0 | Chip_id | For OC192, connect to the starting bit number. Note that chip_id = "00" is the master controller for OC192. For OC48, these pins should be tied high. |

The board active signal is an active low LVTTL input signal which should be low during all board operations. If a board active signal is withdrawn, the striper should terminate the current backplane transfer legally by indicating an end of transfer, non-final segment and should stop transmitting data onto the backplane. The board active signal will be debounced before it gets to the striper.

When the BIB_CONN_EN signal is asserted the BIB_CONN bus is used to provide the Striper with a Connection Number (the Double-Routeword Configuration). This means that the BIB_CONN is configured to be input only. If this BIB_CONN_EN signal is not asserted then the Stiper is in the Single-Routeword configuration and the BIB_CONN bus is useable for connection number exchange in OC192c mode.

The striper runs with 3 main clock regions:
1. 125 MHz board clock
2. Up to 100 MHz Switch Input Bus (BIB) clock
3. 33 MHz AD Bus clock The 125 MHz clock is used for most internal operations.

The AD bus clocks and BIB clocks are both assumed to be asynchronous with respect to all other clocks.

The following spreadsheet shows the internal RAM utilization for the part.

| Function | Words | Width | # of bits | WR freq | RD freq | type |
|---|---|---|---|---|---|---|
| Data FIFO | 1536 | 32 | 49152 | 100 | 125 | 2 port |
| EOC/P/frag FIFO | 128 | 10 | 1280 | 100 | 125 | 2 port |
| Connection number FIFO | 128 | 26 | 3328 | 100 | 125 | 2 port |

The 1536×32 Data FIFO stores the raw data received on the data portion of the BIB. No alignment is done on the writing of data into the FIFO. The 1536-word depth is sized to allow for 119 fragments. This FIFO depth also constrains the maximum number of packets less than 52 bytes that can be received before backpressure is asserted. Note the FIFO is large enough to allow for approximately 64K worth of back-to-back data before the FIFO fills when the FIFO has 4K free bytes at the start of a transfer.

The 256×10 fragment FIFO gives the ending position of data in the FIFO and flags that the data is either the end of packet/cell or a 54 byte fragment. Note that the EOP/fragment indication is used to indicate if a valid start exists in the FIFO.

The 128×26 Connection Number FIFO is used to store the connection for each cell/packet.

In OC192c each Striper only receives one fourth of egress routeword bits that are required to construct the connection number. Therefore, it is necessary for the Stripers to exchange their portion of the connection number with the other Stripers. This operation is supported with the BIB_CONN bus.

When the BIB_CONN_EN signal is asserted the Striper is in the Double Routeword Configuration and the BIB_CONN is strictly used as an input bus 22.

To reduce the overall storage requirements the Striper utilizes fragmentation to allow it to start emptying the buffer before an entire packet is received. Fragments are constructed such that there is always enough data to transmit the minimum length Fabric Routeword (36 bits). This means that all but the last fragment of a long packet only require the minimum length routeword.

When a packet is received that is shorter than that which is required to transmit the minimum length routeword then it is referred to as a Short Packet. A Short Packet is the original packet padded to the minimum transfer size with the original packet length stored as the last pad byte.

1. The incoming bit stream is separated into 4 separate bit streams based on the bit number mod 4=a constant. Each bit stream will have an independent checking function implemented. This bit stream includes all data received, including the routeword (connection number bits 25:0).
2. A 16-bit CRC is calculated over the data using the following a standard 16-bit CRC function $(X^{16}+X^{12}+X^5+1)$ for each of the 4 data streams independently. This calculation will assume that the polynomial has been preset at the start of the calculation.
3. Four bits are selected from each of the 4 CRCs and concatenated together to form the final checksum.

Each slice will use ((bit_number mod 4)*4+3 to (bit_number mod 4)*4.

For an input stream to pass, all four of its CRC functions must pass. Data checking is defined in this way to ensure that OC192c can be supported with minimal overhead. Any CRC over all the data would require the exchange of up to 13 CRC terms per OC192c cell/packet time (2 clock cycles). Since data checking is separate for each slice, the information which needs to be collected at the end is the pass/fail data from each of the 13 CRC functions in all 4 chips and then a final pass/fail can be constructed.

Data arrives at the Striper 4 bytes per cycle and leaves the Striper 3 bytes per cycle. The 3-byte output is actually composed of two 12-bit busses referred to as bus A and bus B. In order to use all available bandwidth, reducing pad bits, a fragment/cell can begin on either bus A or bus B.

The assignment of data bits to fabrics is done in the context of a bit stream view of the data. For OC192c the data is viewed as being broken into blocks of 48 bits and assignment of data bits to fabrics is done within the 48-bit blocks. A start of packet always starts a new 48-bit block. Striping is defined as the mechanism that assigns bit streams of equal width to each of the fabrics. The width of the fabric 14 is inversely proportional to the number of fabrics. To ensure each fabric 14 receives the same number of bits the bits streams are padded.

Striping is defined to meet the following criteria:

1. OC48 data cannot have more than 8 bits of pad required on the backplane bus 22. A bit assignment which has all groups of 12 bits transmitted on the same clock cycle will satisfy this property.
2. OC192 data cannot have more than 40 bits of pad required for the backplane bus 22. Note that this is actually a subset of the first criteria since this requires that all groups of 48 are transmitted on the same clock cycle for the backplane bus 22.
3. The striping definition must not require chip-to-chip communication for data in OC192c operation and the backplane busses must exist largely unchanged for both OC192c and OC48. The assignment of bits to the stripers must allow for the same number of bits to go to each fabric 14 from each striper in OC192c mode.
4. On all fabrics it must be possible to have exactly the same bits going to the memory controllers for either an OC48 or OC192c input port. On the output side, the same bits leave the memory controller and must be convertible into the backplane bus 22 required for either an OC48 or an OC192c output port.

The striping function will be defined by constructing an OC192c solution and modifying OC48 behavior to match the OC192c solution.

For each of the striping configurations, a table has been constructed which gives the bit assignments for each striping. Each table has a row that represents the bits that are connected to the stripers in OC192c mode. Each set of 3 columns in the table represent the bits sent during one cycle of OC48 operation. The following properties will be true for each table:

1. The tables will view the data in blocks of 48 bits. Each 12-bit sub-block will have the same number of bits going to each fabric 14, which will satisfy criteria 1 and 2. The 12-bit sub-block is composed of blocks of data from 3-column groups of all four rows. In order to satisfy the 12 bit sub-block having the same number of bits to each fabric 14, the destination fabric 14 for the first bit from different stripers must rotate among the fabrics present in the switch 10.
2. The bits used for OC48 striping and OC192c striping will be the same. This allows the aggregator 32 to convert the streams to one universal stream for the use on the fabric 14.

The following give assignments for each of the fabric 14 configurations which satisfy these properties.

The parity data which is transmitted is documented in the context of a 96 bit frame. This is to allow for parity exchange between the chips at 125 MHz.

The following table gives the fabric assignments for each block of 48 bits and the output bus 22 assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F0a(1) | F0a(2) | F0a(3) | F0a(4) | F0a(5) | F0a(6) | F0a(7) | F0a(8) | F0a(9) | F0a(10) | F0a(11) |
| Bit | 1 | 5 | 9 | 13 | 17 | 21 | 25 | 29 | 33 | 37 | 41 | 45 |
| BP bus | F0b(0) | F0b(1) | F0b(2) | F0b(3) | F0b(4) | F0b(5) | F0b(6) | F0b(7) | F0b(8) | F0b(9) | F0b(10) | F0b(11) |
| Bit | 2 | 6 | 10 | 14 | 18 | 22 | 26 | 30 | 34 | 38 | 42 | 46 |
| BP bus | F0c(0) | F0c(1) | F0c(2) | F0c(3) | F0c(4) | F0c(5) | F0c(6) | F0c(7) | F0c(8) | F0c(9) | F0c(10) | F0c(11) |
| Bit | 3 | 7 | 11 | 15 | 19 | 23 | 27 | 31 | 35 | 39 | 43 | 47 |
| BP bus | F0d(0) | F0d(1) | F0d(2) | F0d(3) | F0d(4) | F0d(5) | F0d(6) | F0d(7) | F0d(8) | F0d(9) | F0d(10) | F0d(11) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | cycle 0 + 1212 | cycle 0 + 2424 | cycle 0 + 3636 |
| F0(1) | 1 | 13 | 25 | 37 |
| F0(2) | 2 | 14 | 26 | 38 |
| F0(3) | 3 | 15 | 27 | 39 |
| F0(4) | 4 | 16 | 28 | 40 |
| F0(5) | 5 | 17 | 29 | 41 |
| F0(6) | 6 | 18 | 30 | 42 |
| F0(7) | 7 | 19 | 31 | 43 |
| F0(8) | 8 | 20 | 32 | 44 |
| F0(9) | 9 | 21 | 33 | 45 |
| F0(10) | 10 | 22 | 34 | 46 |
| F0(11) | 11 | 23 | 35 | 47 |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F0a(1) | F1a(1) | F0a(2) | F1a(2) | F0a(3) | F1a(3) | F0a(4) | F1a(4) | F0a(5) | F1a(5) |
| Bit | 1 | 5 | 9 | 13 | 17 | 21 | 25 | 29 | 33 | 37 | 41 | 45 |
| BP bus | F1b(0) | F0b(0) | F1b(1) | F0b(1) | F1b(2) | F0b(2) | F1b(3) | F0b(3) | F1b(4) | F0b(4) | F1b(5) | F0b(5) |
| Bit | 2 | 6 | 10 | 14 | 18 | 22 | 26 | 30 | 34 | 38 | 42 | 46 |
| BP bus | F0c(0) | F1c(0) | F0c(1) | F1c(1) | F0c(2) | F1c(2) | F0c(3) | F1c(3) | F0c(4) | F1c(4) | F0c(5) | F1c(5) |
| Bit | 3 | 7 | 11 | 15 | 19 | 23 | 27 | 31 | 35 | 39 | 43 | 47 |
| BP bus | F1d(0) | F0d(0) | F1d(1) | F0d(1) | F1d(2) | F0d(2) | F1d(3) | F0d(3) | F1d(4) | F0d(4) | F1d(5) | F0d(5) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | 13 | +24 to cycle 0 | +24 to cycle 1 |
| F0(1) | 2 | 15 | | |
| F0(2) | 5 | 16 | | |
| F0(3) | 7 | 18 | | |
| F0(4) | 8 | 21 | | |
| F0(5) | 10 | 23 | | |
| F1(0) | 1 | 12 | | |
| F1(1) | 3 | 14 | | |
| F1(2) | 4 | 17 | | |
| F1(3) | 6 | 19 | | |
| F1(4) | 9 | 20 | | |
| F1(5) | 11 | 22 | | |

The following table gives the fabric assignments for each block of 48 bits and the output bus assignments for OC192c operation.

The following table shows the bit order transmitted for OC48 operation.

| Fabric (bit) | Cycle 0 | Cycle 1 | Cycle 2 | Cycle 3 |
|---|---|---|---|---|
| F0(30) | 0 | cycle 0 + 1215 | +24 to cycle 0 + 24 | +24 to cycle 0 + 361 |
| F0(21) | 3 | 17 | | |
| F0(12) | 5 | 22 | | |
| F0(03) | 10 | 13 | | |
| F1(30) | 2 | 14 | | |
| F1(21) | 4 | 16 | | |
| F1(12) | 7 | 19 | | |
| F1(03) | 9 | 21 | | |
| F2(30) | 1 | 13 | | |
| F2(21) | 6 | 18 | | |
| F2(12) | 8 | 20 | | |
| F2(03) | 11 | 23 | | |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(30) | F1a(30) | F2a(30) | F0a(21) | F1a(21) | F2a(21) | F0a(12) | F1a(12) | F2a(12) | F0a(03) | F1a(03) | F2a(03) |
| Bit | 1 | 5 | 9 | 13 | 17 | 21 | 25 | 29 | 33 | 37 | 41 | 45 |
| BP bus | F2b(30) | F0b(30) | F1b(03) | F2b(12) | F0b(12) | F1b(12) | F2b(21) | F0b(21) | F1b(21) | F2b(30) | F0b(30) | F1b(30) |
| Bit | 2 | 6 | 10 | 14 | 18 | 22 | 26 | 30 | 34 | 38 | 42 | 46 |
| BP bus | F1c(30) | F2c(03) | F0c(30) | F1c(12) | F2c(12) | F0c(12) | F1c(21) | F2c(21) | F0c(21) | F1c(30) | F2c(30) | F0c(30) |
| Bit | 3 | 7 | 11 | 15 | 19 | 23 | 27 | 31 | 35 | 39 | 43 | 47 |
| BP bus | F0d(03) | F1d(30) | F2d(03) | F0d(12) | F1d(12) | F2d(12) | F0d(21) | F1d(21) | F2d(21) | F0d(30) | F1d(30) | F2d(30) |

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F0a(1) | F1a(1) | F2a(1) | F3a(1) | F0a(2) | F1a(2) | F2a(2) | F3a(2) |
| Bit | 1 | 5 | 9 | 13 | 17 | 21 | 25 | 29 | 33 | 37 | 41 | 45 |
| BP bus | F3b(0) | F0b(0) | F1b(0) | F2b(0) | F3b(1) | F0b(1) | F1b(1) | F2b(2) | F3b(2) | F0b(2) | F1b(2) | F2b(2) |
| Bit | 2 | 6 | 10 | 14 | 18 | 22 | 26 | 30 | 34 | 38 | 42 | 46 |
| BP bus | F2c(0) | F3c(0) | F0c(0) | F1c(0) | F2c(1) | F3c(1) | F0c(1) | F1c(1) | F2c(2) | F3c(2) | F0c(2) | F1c(2) |
| Bit | 3 | 7 | 11 | 15 | 19 | 23 | 27 | 31 | 35 | 39 | 43 | 47 |
| BP bus | F1d(0) | F2d(0) | F3d(0) | F0d(0) | F1d(1) | F2d(1) | F3d(1) | F0d(1) | F1d(2) | F2d(2) | F3d(2) | F0d(2) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | 15 | 26 | 37 |
| F0(1) | 5 | 16 | 31 | 42 |
| F0(2) | 10 | 21 | 32 | 47 |
| F1(0) | 3 | 14 | 25 | 36 |
| F1(1) | 4 | 19 | 30 | 41 |
| F1(2) | 9 | 20 | 35 | 46 |
| F2(0) | 2 | 13 | 24 | 39 |
| F2(1) | 7 | 18 | 29 | 40 |
| F2(2) | 8 | 23 | 34 | 45 |
| F3(0) | 1 | 12 | 27 | 38 |
| F3(1) | 6 | 17 | 28 | 43 |
| F3(0) | 11 | 22 | 33 | 44 |

The following table gives the fabric assignments for each block of 48 bits and the output bus assignments for OC192c.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F4a(0) | F5a(0) | F0a(1) | F1a(1) | F2a(1) | F3a(1) | F4a(1) | F5a(1) |
| Bit | 1 | 5 | 9 | 13 | 17 | 21 | 25 | 29 | 33 | 37 | 41 | 45 |
| BP bus | F1b(0) | F2b(0) | F3b(0) | F4b(0) | F5b(0) | F0b(0) | F1b(1) | F2b(1) | F3b(1) | F4b(1) | F5b(1) | F0b(1) |
| Bit | 2 | 6 | 10 | 14 | 18 | 22 | 26 | 30 | 34 | 38 | 42 | 46 |
| BP bus | F3c(0) | F4c(0) | F5c(0) | F0c(0) | F1c(0) | F2c(0) | F3c(1) | F4c(1) | F5c(1) | F0c(1) | F1c(1) | F2c(1) |
| Bit | 3 | 7 | 11 | 15 | 19 | 23 | 27 | 31 | 35 | 39 | 43 | 47 |
| BP bus | F4d(0) | F5d(0) | F0d(0) | F1d(0) | F2d(0) | F3d(0) | F4d(1) | F5d(1) | F0d(1) | F1d(1) | F2d(1) | F3d(1) |

The following table shows the bit order transmitted for OC48 operation.

| Output Bit | Fabric (bit) | Cycle 0 | Cycle 1 | Cycle 2 | Cycle 3 |
|---|---|---|---|---|---|
| 11 | F0(0) | 0 | 14 | +24 cycle 0 | +24 cycle 1 |
| 10 | F0(1) | 11 | 21 | | |
| 9 | F1(0) | 1 | 15 | | |
| 8 | F1(1) | 4 | 18 | | |
| 7 | F2(0) | 5 | 19 | | |
| 6 | F2(1) | 8 | 22 | | |
| 5 | F3(0) | 2 | 12 | | |
| 4 | F3(1) | 9 | 23 | | |
| 3 | F4(0) | 3 | 13 | | |
| 2 | F4(1) | 6 | 16 | | |
| 1 | F5(0) | 7 | 17 | | |
| 0 | F5(1) | 10 | 20 | | |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F4a(0) | F5a(0) | F0a(1) | F1a(1) | F2a(1) | F3a(1) | F4a(1) | F5a(1) |
| Bit | 1 | 5 | 9 | 13 | 17 | 21 | 25 | 29 | 33 | 37 | 41 | 45 |
| BP bus | F3b(0) | F4b(0) | F5b(0) | F0b(0) | F1b(0) | F2b(0) | F3b(1) | F4b(1) | F5b(1) | F0b(1) | F1b(1) | F2b(1) |
| Bit | 2 | 6 | 10 | 14 | 18 | 22 | 26 | 30 | 34 | 38 | 42 | 46 |

-continued

| BP bus | F0c(0) | F1c(0) | F2c(0) | F3c(0) | F4c(0) | F5c(0) | F0c(1) | F1c(1) | F2c(1) | F3c(1) | F4c(1) | F5c(1) |
|---|---|---|---|---|---|---|---|---|---|---|---|---|
| Bit | 3 | 7 | 11 | 15 | 19 | 23 | 27 | 31 | 35 | 39 | 43 | 47 |
| BP bus | F3d(0) | F4d(0) | F5d(0) | F0d(0) | F1d(0) | F2d(0) | F3d(1) | F4d(1) | F5d(1) | F0d(1) | F1d(1) | F2d(1) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | 15 | cycle 0 + 24 | cycle 1 + 24 |
| F0(1) | 2 | 13 | | |
| F1(0) | 4 | 19 | | |
| F1(1) | 6 | 17 | | |
| F2(0) | 8 | 23 | | |
| F2(1) | 10 | 21 | | |
| F3(0) | 1 | 14 | | |
| F3(1) | 3 | 12 | | |
| F4(0) | 5 | 18 | | |
| F4(1) | 7 | 16 | | |
| F5(0) | 9 | 22 | | |
| F5(1) | 11 | 20 | | |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F4a(0) | F5a(0) | F6a(0) | F7a(0) | F8a(0) | F9a(0) | F10a(0) | F11a(0) |
| Bit | 1 | 5 | 9 | 13 | 17 | 21 | 25 | 29 | 33 | 37 | 41 | 45 |
| BP bus | F3b(0) | F4b(0) | F5b(0) | F6b(0) | F7b(0) | F8b(0) | F9b(0) | F10b(0) | F11b(0) | F0b(0) | F1b(0) | F2b(0) |
| Bit | 2 | 6 | 10 | 14 | 18 | 22 | 26 | 30 | 34 | 38 | 42 | 46 |
| BP bus | F6c(0) | F7c(0) | F8c(0) | F9c(0) | F10c(0) | F11c(0) | F0c(0) | F1c(0) | F2c(0) | F3c(0) | F4c(0) | F5c(0) |
| Bit | 3 | 7 | 11 | 15 | 19 | 23 | 27 | 31 | 35 | 39 | 43 | 47 |
| BP bus | F9d(0) | F10d(0) | F11d(0) | F0d(0) | F1d(0) | F2d(0) | F3d(0) | F4d(0) | F5d(0) | F6d(0) | F7d(0) | F8d(0) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | 15 | 26 | 37 |
| F1(0) | 4 | 19 | 30 | 41 |
| F2(0) | 8 | 23 | 34 | 45 |
| F3(0) | 1 | 12 | 27 | 38 |
| F4(0) | 5 | 16 | 31 | 42 |
| F5(0) | 9 | 20 | 35 | 46 |
| F6(0) | 2 | 13 | 24 | 39 |
| F7(0) | 6 | 17 | 28 | 43 |
| F8(0) | 10 | 21 | 32 | 47 |
| F9(0) | 3 | 14 | 25 | 36 |
| F10(0) | 7 | 18 | 29 | 40 |
| F11(0) | 11 | 22 | 33 | 44 |

The data for each fabric 14 is assigned to transceivers based on the number of fabrics configured.

The Fabric Routeword is constructed based on the length of the out-going fragment and the configuration that was present when it was striped. The constructed Fabric Routeword is transmitted on bits 2 (bus A routeword bit) and 3 (bus B routeword bit) of the first transceiver allocated to a fabric 14.

The parity data is identical to the transmit data.

The parity calculation uses the following formulas and the following aggregator 32 read order

| Bit | Transmit stripe | XOR bits |
|---|---|---|
| P0 | 0 | 0, 4 |
| P1 | 2 | 2, 6 |
| P2 | 1 | 1, 5 |
| P3 | 3 | 3, 7 |
| P4 | 0 | 8, 9 |
| P5 | 2 | 10, 11 |
| P6 | 1 | 13, 17 |
| P7 | 3 | 15, 19 |
| P8 | 0 | 16, 12 |
| P9 | 2 | 18, 14 |
| P10 | 1 | 20, 21 |
| P11 | 3 | 22, 23 |

Note that parity bits P12–P24 repeat the pattern of P0–P11.

For generation of parity, 2 bits are exchanged between S0->S1 and S2->S3 for each 24 bit word, one bit in either direction. The following table shows the bits transmitted on each output parity bus.

| Striper | Bus | Function (96 bits) |
|---|---|---|
| A | A4 | 20, 44, 64, 92 (20 + I*24) |
| | B2 | "00" |
| | C2 | "00" |
| B | A4 | 9, 33, 57, 81 |
| | B2 | "00" |
| | C2 | "00" |
| C | A4 | 22, 46, 66, 94 |
| | B2 | "00" |
| | C2 | "00" |
| D | A4 | 11, 35, 59, 83 |
| | B2 | "00" |
| | C2 | "00" |

The parity calculation uses the following formulas: and the following aggregator 32 read order

| Bit | Transmit stripe | XOR bits |
| --- | --- | --- |
| P0 | 0 | 0, 4, 8 |
| P1 | 3 | 3, 7, 11 |
| P2 | 1 | 1, 5, 9 |
| P3 | 2 | 2, 6, 10 |
| P4 | 0 | 12, 16, 20 |
| P5 | 3 | 15, 19, 23 |
| P6 | 1 | 13, 17, 21 |
| P7 | 2 | 14, 18, 22 |

Note that parity bits P8–P15 repeat the pattern of P0–P11.

Parity generation requires no exchange of bits for OC192c.

The parity calculation uses the following formulas and the following aggregator 32 read order

| Bit | Transmit stripe | XOR bits |
| --- | --- | --- |
| P0 | St0 | 0, 4, 8, 11 |
| P1 | St1 | 1, 5, 9, 7 |
| P2 | St2 | 2, 3, 6, 10 |
| P3 | St3 | 15, 19, 22, 23 |
| P4 | St0 | 12, 16, 18, 20 |
| P5 | St1 | 21, 13, 14, 17 |
| P6 | St2 | 26, 30, 33, 34 |
| P7 | St3 | 27, 29, 31, 35 |
| P8 | St0 | 24, 25, 28, 32 |
| P9 | St1 | 37, 41, 44, 45 |
| P10 | St2 | 38, 40, 42, 46 |
| P11 | St3 | 36, 39, 43, 47 |

Generation of parity for OC192c requires each striping giving every other striper 1 bit/48 bits of data. The following table shows the bits transmitted on each output parity bus.

| Striper | Bus | Function (96 bits) |
| --- | --- | --- |
| A | A4 | "00" & 44, 92 |
|   | B2 | 40, 88 |
|   | C2 | 36, 84 |
| B | A4 | "00" & 25, 73 |
|   | B2 | 33, 81 |
|   | C2 | 29, 77 |
| C | A4 | 22, 70 |
|   | B2 | 14, 62 |
|   | C2 | 18, 66 |
| D | A4 | "00" & 7, 55 |
|   | B2 | 3, 51 |
|   | C2 | 11, 59 |

The parity calculation uses the following:

| Bit | Transmit stripe | XOR bits |
| --- | --- | --- |
| P0 | 0 | 0, 4, 8, 1, 5, 9 |
| P1 | 2 | 2, 6, 10, 3, 7, 11 |
| P2 | 1 | 13, 17, 21, 12, 16, 20 |
| P3 | 3 | 15, 19, 23, 14, 18, 22 |

Note that parity bits P4–P8 repeat the pattern of P0–P3+24. The following table shows the bits transmitted on each output parity bus.

| Striper | Bus | Function (96 bits) |
| --- | --- | --- |
| A | A4 | (12 × 16 × 20), (36 × 40 × 44), (60 × 64 × 68), (84 × 88 × 92) |
|   | B2 | "00" |
|   | C2 | "00" |
| B | A4 | (1 × 5 × 9), (25 × 29 × 33), (49 × 53 × 57), (73 × 77 × 81) |
|   | B2 | "00" |
|   | C2 | "00" |
| C | A4 | (14 × 18 × 22), (38 × 42 × 46), (62 × 66 × 70), (86 × 90 × 94) |
|   | B2 | "00" |
|   | C2 | "00" |
| D | A4 | (3 × 7 × 11), (27 × 31 × 35), (51 × 55 × 59), (75 × 79 × 83) |
|   | B2 | "00" |
|   | C2 | "00" |

The parity calculation uses the following formulas and the following aggregator 32 read order:

| Bit | Transmit stripe | XOR bits |
| --- | --- | --- |
| P0 | St0 | 0–11 |
| P1 | St1 | 12–23 |
| P2 | St2 | 24–35 |
| P3 | St3 | 36–47 |

The following table shows the bits transmitted on each output parity bus.

| Striper | Bus | Function (96 bits) |
| --- | --- | --- |
| A | A4 | "00" & (12 × 16 × 20) & (48 × 52 × 56) |
|   | B2 | (24 × 28 × 32) & (48 × 52 × 56) |
|   | C2 | (36 × 40 × 44) & (84 × 88 × 92) |
| B | A4 | "00" & (1 × 5 × 9) & (49 × 53 × 57) |
|   | B2 | (25 × 29 × 33) & (49 × 53 × 57) |
|   | C2 | (37 × 41 × 45) & (85 × 89 × 91) |
| C | A4 | "00" & (38 × 42 × 46) & (86 × 90 × 94) |
|   | B2 | (14 × 18 × 22) & (62 × 66 × 70) |
|   | C2 | (2 × 6 × 10) & (50 × 54 × 58) |
| D | A4 | "00" & (27 × 31 × 35) & (51 × 55 × 59) |
|   | B2 | (15 × 19 × 23) & (63 × 67 × 71) |
|   | C2 | (3 × 7 × 11) & (51 × 55 × 59) |

The striper generates backpressure for the BIB bus based on FIFO utiliziation. Backpressure should be asserted if the number of free fragments in the EOP FIFO falls to less than the programmed backpressure fragment count. This fragment count will be programmed to generated backpressure with a FIFO pad of 2–3 fragments.

Data can be read from the FIFO when either an EOP is seen at the head of the FIFO (a cell/packet is only a single fragment long) or when a fragment has been read and another fragment follows. If another fragment does not follow, it is EOP and in general the EOP must be read in concert with a previous fragment since it can be less than 54 bytes.

When the head of the FIFO is a cell that has a fabric routeword that matches the value in the unsplit routeword register then the reading of the cell is delayed if necessary until the second cell has been stored in the FIFO. The two cells will then be read and unsplit to form a single cell to be transmitted.

Cell synchronization uses the standard switch sync mechanism. The transmitter behavior is utilized in this chip. When configured in OC192c mode the master striper will assert the MASTER_lockdown_valid signal to all slave stripers when its own lockdown_valid signal is asserted. The master striper will also assert the MASTER_sync_valid signal to all slave stripers when its sync_valid signal is asserted. This master-controlled synchronization is necessary to ensure that all stripers start transmitting valid data the same number of cycles after transmitting the SYNC character.

One striper will decide when to transmit data to the backplane. It will communicate that information to the other three stripers across a bus 22. Four clock cycles after the start of the operation, the stripers will start to exchange parity data on every clock cycle while the transfer is running.

The master striper will transmit the following signals to all slaves which will sequence reads for OC192c appropriately.

Note that each output bus and input bus carry a SOF bit to indicate the start of a fragment and a clock bit. The SOF bit is multi-dropped from one chip to all 3 receivers, but 3 clock signals are formed. This gives a total output bus of 8 bits of data, 1 SOF and 3 clocks (12 bits). The receive side is 8 bits of data, 3 SOF, and 3 clocks (14 bits). Each chip will drive the SOF with its parity. 8 clock cycles of delay will be inserted in the master, 4 in each of the slaves to allow for sufficient time for parity data to be exchanged.

The version number register is a read only register which identifies the chip revision.

| Bit | Label | Function |
| --- | --- | --- |
| 31:16 | Unused | |
| 15:12 | Version number | Gives the version number of the ASIC. Starting version number is 0001. |
| 11:0 | Chip ID | Gives the chip ID of the striper. |

| Label | Direction | Function |
| --- | --- | --- |
| Start | Master-O | Driven to a zero to indicate start of next fragment, one for non-start of packet. |
| Numb_fab | Master-O, slave-I | Driven by the master to indicate the number of fabrics the current packet should be driven to. |
| Stop | Master-O | Driven to a zero to indicate the last fragment to be transmitted with the routeword transmitted with start. FS bits will be figured out using internal information in each slave. |
| SS_CLK | Master-O | 3 clocks, one for each receiver. Used as the bus clock for the start, numb_fab, and stop fields. |
| IB_EN | Master-O | Input bus enable. If this signal is a zero, all slaves will discard all data from the FIFOs. This signal is set to a one to indicate the start bit is valid. |

Four clock cycles after a start has been signaled, the parity exchange bus starts working on the current packet. Each striper has a 10 bit input bus and a 10 bit output bus which are used to connect the chips together for exchange of parity information for each 96 bits of backplane data. Each chip produces a 4-bit bus and two 2-bit busses (A4, B2 and C2). Additionally, each chip accepts a 4-bit bus and two 2-bit busses (D4, E2, F2). The number of bits utilized for each bus varies based on the striping configuration.

These busses are interconnected in the following fashion.

The main control register controls the configuration of the chip.

| Output Interfaces | | Input Interface | | | | | | | | | | | |
| --- | --- | --- | --- | --- | --- | --- | --- | --- | --- | --- | --- | --- | --- |
| | | St 0 D4 | St 0 E2 | St 0 F2 | St 1 D4 | St 1 E2 | St 1 F2 | St 2 D4 | St 2 E2 | St 2 F2 | St 3 D4 | St 3 E2 | St 3 F2 |
| | Striper 0 output | | | | A4 | | | | B2 | | | | C2 |
| | Striper 1 output | A4 | | | | | | | | B2 | | C2 | |
| | Striper 2 Output | | C2 | | | | | B2 | | | A4 | | |
| | Striper 3 outputs | | | C2 | | B2 | | A4 | | | | | |

| Bit | Reset Value | Mode | Label | Function |
|---|---|---|---|---|
| 31:19 | 0 | N/A | unused | |
| 18 | N/A | R | BIB_CONN enabled | Set this bit to enable the use of the BIB_CONN input bus to obtain the fabric connection number rather than finding it in the first four bytes of data. |
| 17:10 | 16#00# | R/W | Egress rw sub field | Data field used with the egress rw sub enable bit. |
| 9 | 0 | R/W | Egress rw sub enable | Set this bit to a one to substitute egress RW sub field into the upper 8 bits of the connection ID for the egress RW for the split RW. |
| 8 | 0 | R/W | BIB_BP_polarity | Set this bit to a one to indicate the BIB_BP signal should be active high, set to a zero for active low. |
| 7 | 0 | R/W | BIB_SOP/Eop polarity | Set this bit to a one to indicate BIB SOP/EOP are active high signals, set to a zero for active low signals. |
| 6:5 | N/A | R | OC192c chip id | Returns the value of chip id set on the input pins. |
| 4 | N/A | R | OC192c | Returns the value present on the OC48/oc192 pin. One indicates an OC192, zero an OC48. |
| 3 | 0 | R/W | Input bus enable | Set this bit to a one to enable receiving data on the input bus. |
| 2:0 | 2#000# | R/W | Number of fabrics | Specifies the number of fabrics which are used in the current striping configuration. These values are encoded as follows:<br>000-One fabric<br>001-Two fabrics<br>010-Three fabrics<br>011-Four fabrics<br>100-Six fabrics<br>101-twelve fabrics.<br>Note this field is only used by the master chip in a OC192c configuration. Changing the striping configuration becomes effective on the next start of packet. Any fragmented packet will have every packet fragment support the same striping configuration. |

This register contains a status information to report errors. All bits are cleabed on read.

| Bit | Reset Value | Mode | Label | Function |
|---|---|---|---|---|
| 3 | 0 | R/C | pe_sync_error | Parity exchange sync error |
| 2 | 0 | R/C | loss_of_sync | Loss of global sync |
| 1 | 0 | R/C | packet_dropped | This bit is set to a one if a packet drop has occurred. Note that this should only happen in hardware error situations (ignoring back-pressure signal), so no drop counter is provided. |
| 0 | 0 | R/C | ICB_valid | This bit is a one when the ICB has a valid packet or cell. |

The interrupt mask enables the interrupt for the given bit in the main status register. A mask bit must be set to '1' in order to enable the interrupt.

| Bit | Reset Value | Mode | Label | Function |
|---|---|---|---|---|
| 3 | 0 | R/C | pe_sync_error | Parity exchange sync error interrupt enable |
| 2 | 0 | R/C | loss_of_sync | Loss of global sync error interrupt enable |
| 1 | 0 | R/C | packet_dropped | Packet dropped interrupt enable |
| 0 | 0 | R/C | ICB_valid | ICB valid interrupt enable |

The output enable register controls the ports enabled for the first output busses on the device. This bit must be a one and the fabric presence bit must be asserted to enable the drivers to a fabric.

| Bit | Reset Value | Mode | Label | Function |
|---|---|---|---|---|
| 12:0 | 16#00# | R/W | Output Enable | Set each bit to a one to enable the same numbered output bus. Bit 12 is the output enable for parity, bits 0–11 are for outputs to fabrics 0–11 respectively. |

The BIB backpressure control register controls when the striper asserts the backpressure signal. Whenever the number of available blocks (54 byte chunks) in memory falls below this value, backpressure is asserted. This register should be set equal to Max_packet_size/64K*75−4.

| Bit | Reset Value | Mode | Label | Function |
|---|---|---|---|---|
| 7:0 | 16#00# | R/W | count | Set to the number calculated above. To disable backpressure, program to zero. |

The striper provides a software interface to a cell storage location. This location can either store an ATM cell or a fragment up to 64 bytes long.

To read a cell/fragment from the FIFO, perform the following actions:
1. Initialize the Output Enable/Trap enable register to trap a cell on the desired condition.
2. Wait for the Trap Valid bit to be set in the main status register.
3. The data is now available in the ICB data registers.

To write a cell/packet, perform the following actions Disable all traps into the ICB using the ICB trap/tx enable register.

Write the data to the Data FIFO first data registers. The first four bytes of data are used to form the fabric routeword. The next four bytes are used as memory controller routeword. The remaining bytes are used as cell/packet data. Write to the ICB trap/tx enable register to send the data.

This register is used to control the storage of cells to the ICB.

| Bit | Reset Value | Mode | Label | Function |
|---|---|---|---|---|
| 11:6 | 16#00# | R/W | Byte_count | Set these bits to the number of bytes to transmit from the ICB. |
| 5:3 | 2#000# | R/W | Trap_mux_sel | Selects the point in the output pipeline where the data will be trapped. |
| 2 | 0 | R/W | Transmit | Set this bit to a one to force the transmit of the ICB cell onto the backplane. After transmission, this bit is cleared automatically by the hardware. |
| 1 | 0 | R/W | DIN_recent | Set this bit to a one to trap the most recent cell (or first 52 bytes of data for a packet) into the ICB. |
| 0 | 0 | R/W | DIN_first | Set this bit to a one to trap the first cell (or first 52 bytes of data for a packet) into the ICB. |

This register reads and write the location used for the fabric routeword. If a cell is captured, this is the fabric routeword which was input to the chip.

| Bit | Reset Value | Mode | Label | Function |
|---|---|---|---|---|
| 29 | 0 | R/W | Pkt_cell | Selects the packet/cell indication bit. |
| 28:26 | 2#000# | R/W | Stripe_amount | Gives the stripe amount for the cell/packet. This value is encoded as follows: 000-One fabric 001-Two fabrics 010-Three fabrics 011-Four fabrics 100-Six fabrics 101-twelve fabrics. |
| 25 | 0 | R/W | Uc_mc | Selects the UC/MC bit for the fabric. |
| 24:0 | 16#0_0000# | R/W | conn | Gives the connection number used by the fabric. |

This register reads the byte at the head of the data FIFO.

| Bit | Reset Value | Mode | Label | Function |
|---|---|---|---|---|
| 31:0 | 16#0000_0000# | R/W | Routeword | Gives the value of the memory controller routeword. |

These registers correspond to one 32 bit value in the ICB.

| Bit | Reset Value | Mode | Label | Function |
|---|---|---|---|---|
| 31:0 | 16#0000_0000# | R/W | Data | Gives the value of the corresponding packet/cell data. |

Note that bytes are transmitted counting ICB memory controller routeword and starting with ICB data 0 until bthe bytes count is exhausted. Non-32 bit byte count values will treat bits 7:0 as the first byte, bits 15:8 as the second, bits 23:16 as the third and bits 31:24 as the fourth.

The synch delay register controls configuration of the counters used for synchronization.

| Bit | Reset Value | Mode | Label | Function |
|---|---|---|---|---|
| 15:0 | 16#0000# | R/W | Tick Length | Number of clock cycles before the master sequence counter is incremented. The tick length controls the time duration which one sequence value is transmitted. Dividing the programmed value by either 36 (OC48) or 9 (OC192) gives the maximum number of packets which can be transmitted. Due to FIFO limitations, this value should be programmed to a value less than or equal to 1024. |

Note that the synch_debug register should be read after updating the synch delay register to flush out any stale data in the synch debug register.

The synch_debug register is used to monitor the state of the synchronization logic.

| Bit | Reset Value | Mode | Label | Function |
|---|---|---|---|---|
| 7:0 | 16#00# | R | Clk_diff | The clock speed difference register is used as a rough heartbeat for the synch logic. It counts the number of clocks in the last pause due to resynch. A negative value is represented by a '1' in the MSB of the register. |

The striper supports unsplitting for the control port. Unsplitting is taking multiple back to back cells, treating it as one AAL5 frame and transporting the AAL5 data as the raw data for the backplane. In general, there is no hardware dependancy on the number of cells which can be split or unsplit, but the prime intention is to utilize two cells to encapsulate 60 bytes of data. Cells to be unsplit in the striper are identified by an incoming routeword match on the memory controller routeword.

The bits used for the fabric routeword are formatted as shown in the following table.

| Bit | Reset Value | Mode | Label | Function |
|---|---|---|---|---|
| 28 | 0 | R/W | Pck/cell | Selects the packet/cell indication bit. |
| 27:25 | 2#000# | R/W | Stripe_amount | Gives the stripe amount for the cell/packet. This value is encoded as follows: 000-One fabric 001-Two fabrics 010-Three fabrics 011-Four fabrics 100-Six fabrics 101-twelve fabrics. |
| 24 | 0 | R/W | UC/MC indication | Selects the UC/MC bit for the fabric. |
| 23:0 | 16#0_0000# | R/W | Fab conn numb | Gives the connection number used by the fabric. |

This register is used to identify cells which need to be put through the unsplitter. Any cell which has a memory controller routeword match this register is unsplit. It is assumed that all cells to be unsplit will be received back to back.

| Bit | Reset Value | Mode | Label | Function |
|---|---|---|---|---|
| 31:0 | 16#0000_0000# | R/W | RW value | Gives the required value of the memory controller routeword for unsplitting. |

The following table gives the timing contraints used for timing analysis. Any designs which meet these constraints should work across any respins. The columns have the following meanings:

| CLK | Gives the reference clock for the timing. All timing values are given in reference to the clock signal arriving at the associated clock pin on striper. |
|---|---|
| Min_time | This gives the minimum amount of time before an output signal transitions. This can be used to calculate hold time. |
| Max_time | This gives the maximum amount of time until an output signal is stable. |
| Output Load | Load used for max_time. Other loads can be used, greater loads increase time, smaller loads decrease time. |
| Drive | Type of drive book. |
| Comments | Any comments (primarily on the derivation of output load). |

| Pin | ClkM in Time | Max Time | Output Load | Drive | Comments |
|---|---|---|---|---|---|
| TDO | TCK | | | 10 pF | |

The following table gives the input timing. The columns have the following meanings:
  CLK Gives the reference clock for the timing. A value of N/A either means the signal is not speced for transition or that the signal is not assumed to asynchronous wrt all input clocks.
  Setup/hold same thing they mean everywhere else.
  Pin cap Pin capacitance presented by the receiver or bidi.
  Comments Any comments (primarily on the derrivation of output load).

The chip was timed assuming the following arrival times for clocks:

| Clock | Clock | Supported Skew | Notes |
|---|---|---|---|
| AD_CLK | any | Any | AD_CLK is asynchronous with rest of chip. Unstriper supports speeds from 20 MHz to 33 MHz on AD_CLK. The speed limit on the AD clock is primarily I/O timing related, chip internals run up to 40. Any applications which desire above 33 MHz should talk to the design team. |

Figure 3:
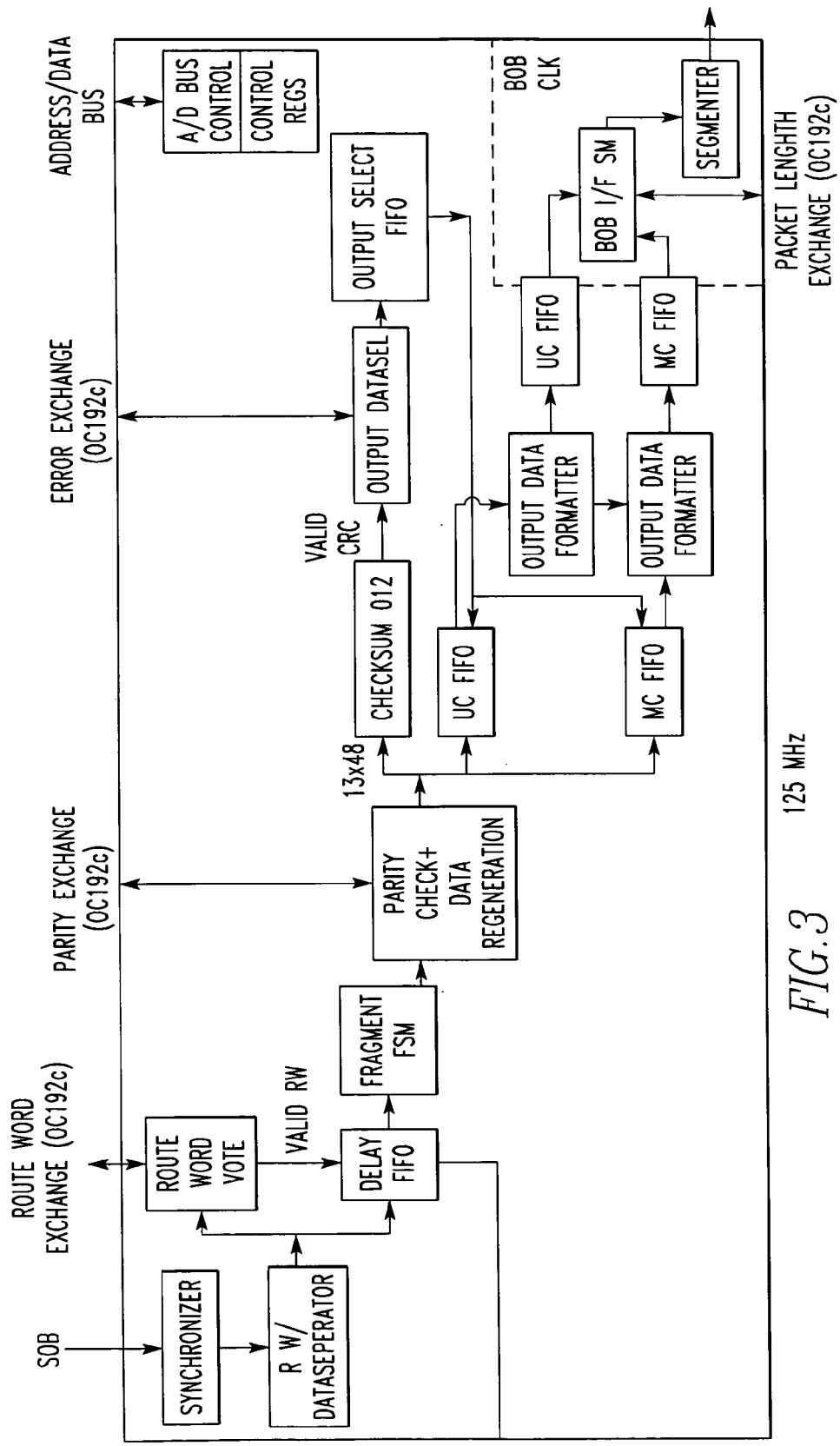
FIG. 3 is a schematic representation of the unstriper of the present invention.

The structure of the Unstriper is shown in FIG. 3.

The Synchronizer de-skews SOB data based on information obtained during global synchronization. Valid received data is sent to the RW/Data Separator 34.

The route word data separator 34 takes the current switch 10 configuration and separates route words and data into separate paths. Route words are passed to the Routeword Voter. Data is written into the Data Delay FIFO.

The Routeword Voter detects differences in the routeword stream and passes the error vector downstream. In OC192c mode, the Routeword Voter utilizes the Routeword Exchange bus to communicate routeword and End-of-Packet (EOP) information across the four Unstripers.

The Data Delay FIFO stores raw incoming receiver data until a valid number-of-fabrics (NF) has been extracted from the valid routeword. The NF is used to extract the fabric data from the received data for the Fragment FSM.

The Fragment FSM receives data from the Data Delay FIFO and constructs 48-bit cycles of data that are then passed to the Parity Check+Fabric Data Regeneration block. This step is necessary for 40, 80 and 240-slow bandwidth configuration modes as they do not provide a full 48-bits of data per cycle.

Parity Check+Data Regeneration will form up to thirteen (twelve fabrics plus one parity) data streams that will be checked for parity errors. Each generated data stream will be output to a checksum checker. In OC192c mode the Parity Exchange bus is used to compute the parity across all of the fabric data.

The checksum checkers perform an error check on the incoming data. There is one checksum for each of the thirteen regenerated data streams coming out of Parity Check+Data Regeneration. The checksum checkers support two logical contexts and can switch between them. One logical context is used to support unicast (UC) traffic coming from the fabrics and one to support multicast (MC) traffic coming from the fabrics.

Output Data Select finds an output combination with valid routewords and a passing checksum (if one exists). If so, the valid output select is passed to the Output Data Formatter block, which then reads the data from the Fabric Data FIFO substituting regenerated data for up to one fabric if necessary. In OC192c mode, the Error Exchange bus is used by each slave Unstriper to send its error information to the master Unstriper. The master Unstriper uses all of the error information received plus its own error information to determine the valid combination inputs, if any, and sends the determination back to each slave Unstriper.

These buffers defragment and store the received data and the regenerated data during the checksum checking and while it is waiting to go out the output interface. These buffers are sized sufficiently large to hold one 64K packet for UC traffic and one 64K packet for MC traffic.

The Output Data Formatter select forwards the data from the Reassembly Buffers to the BOB FIFO for the output mapping indicated by the Output Select FIFO. The mapping given in the output selection word is assumed to be valid for the entire packet/cell.

The BOB FIFO (one for each context) buffers data during periods of backpressure from the BOB interface or while the other context is actively using the BOB I/F. All packets stored into these FIFOs start on 64-bit boundaries.

The output of the BOB FIFO is where the data crosses from the core clock domain to the BOB clock domain.

The BOB I/F forwards data to the Segmenter from the UC and MC BOB Data FIFOs based on order of arrival of packets to those FIFOs. In OC192c mode the Packet Length Exchange bus is used so that each Unstriper can properly shorten minimum length packets (>=52 bytes) that represent short packets (<52 bytes). Byte 52 of the minimum length packet contains the actual length of the short packet. In OC192c mode each Unstriper receives two bits of this length which must then be sent to the other Unstripers to reconstruct the entire 8-bit value.

The packet length exchange occurs at this point in the flow because it is the first place where this is only one context and the data is valid.

The Segmenter divides packets into AAL5 encapsulated ATM cells. The Segmenter has a BOB-style interface with the Unstriper to support its development as a separate effort.

The following table gives the I/O definition for the chip. The DIR column indicates an output is either an input (I), output (O) or bidir (B).

Chip mode is a 3 bit bus. It has the following signals.

| Chip_Mode | Label   | Function                                                                                                                                                                     |
| --------- | ------- | ---------------------------------------------------------------------------------------------------------------------------------------------------------------------------- |
| 2         | Mode    | Tie to a one for OC192, zero for an OC48.                                                                                                                                    |
| 1:0       | Chip_id | For OC192, connect to the starting bit number. Note that chip_id = "00" is the master controller for OC192. For OC48, these pins should be tied high. |

The Unstriper has multiple clock regions:

1. 125 MHz SOB clock (1 from each receiver channel);
2. 125 MHz Core clock;
3. 80–125 MHz BOB clock; and,
4. 66 MHz ADB clock.

Each clock is assumed to be asynchronous with respect to all other clocks. The higher-level protocol of global synchronization is expected to handle any issues with FIFO overflow due to clock drift.

The following spreadsheet shows the internal RAM utilization for the part.

| Function            | Words | Width | # of bits | WR freq | RD freq | Type        |
| ------------------- | ----- | ----- | --------- | ------- | ------- | ----------- |
| Valid Routeword FIFO | 128   | 66    | 8448      | 125     | 125     | 2 port-RA   |
| Data Delay FIFO     | 256   | 92    | 23552     | 125     | 125     | 2 port-SRAM |
| Incoming Data FIFO-UC | 5632 | 96    | 540672    | 125     | 125     | 1 port-SRAM |
| Incoming Data FIFO-MC | 5632 | 96    | 540672    | 125     | 125     | 1 port-SRAM |
| Regen'd Data FIFO-UC | 5632  | 96    | 540672    | 125     | 125     | 1 port-SRAM |
| Regen'd Data FIFO-MC | 5632  | 96    | 540672    | 125     | 125     | 1 port-SRAM |
| Output Select FIFO  | 3072  | 28    | 86016     | 125     | 125     | 2 port-SRAM |
| BOB-Data FIFO-UC    | 4096  | 128   | 524288    | 125     | 125     | 1 port-SRAM |
| BOB-Data FIFO-MC    | 4096  | 128   | 524288    | 125     | 125     | 1 port-SRAM |
| Terminated Cell FIFO | 256  | 38    | 9728      | 125     | 125     | 2 port-RA   |
| Sync FIFO-Rcvr 0    | 256   | 10    | 2560      | 125     | 125     | 2 port-RA   |
| Sync FIFO-Rcvr 1    | 256   | 10    | 2560      | 125     | 125     | 2 port-RA   |
| Sync FIFO-Rcvr 2    | 256   | 10    | 2560      | 125     | 125     | 2 port-RA   |
| Sync FIFO-Rcvr 3    | 256   | 10    | 2560      | 125     | 125     | 2 port-RA   |
| Sync FIFO-Rcvr 4    | 256   | 10    | 2560      | 125     | 125     | 2 port-RA   |
| Sync FIFO-Rcvr 5    | 256   | 10    | 2560      | 125     | 125     | 2 port-RA   |
| Sync FIFO-Rcvr 6    | 256   | 10    | 2560      | 125     | 125     | 2 port-RA   |
| Sync FIFO-Rcvr 7    | 256   | 10    | 2560      | 125     | 125     | 2 port-RA   |
| Sync FIFO-Rcvr 8    | 256   | 10    | 2560      | 125     | 125     | 2 port-RA   |
| Sync FIFO-Rcvr 9    | 256   | 10    | 2560      | 125     | 125     | 2 port-RA   |
| Sync FIFO-Rcvr 10   | 256   | 10    | 2560      | 125     | 125     | 2 port-RA   |

-continued

| Function | Words | Width | # of bits | WR freq | RD freq | Type |
|---|---|---|---|---|---|---|
| Sync FIFO-Rcvr 11 | 256 | 10 | 2560 | 125 | 125 | 2 port-RA |
| Sync FIFO-Rcvr 12 | 256 | 10 | 2560 | 125 | 125 | 2 port-RA |
| Sync FIFO-Rcvr 13 | 256 | 10 | 2560 | 125 | 125 | 2 port-RA |
|  |  |  | 35840 |  |  |  |
| Total |  |  | 3374848 |  |  |  |

SOB synchronization uses the standard Switch Global Synchronization mechanism. The Unstriper implements the receiver portion of the synchronization logic.

All received routewords (as determined by the contents of the Input Enables register) are compared against the routeword immediately below it (where below is over the routewords 0 to N−1 for a switch with N fabrics). Any single mismatch will have two adjacent zeros and the rest ones. A double mismatch will result in more than one region of zeros or a region with more than two adjacent zeros. In the single error case, the first location with a mismatch is the erroneous location (a lane is considered correct if its comparison output is a one or if the next comparison output is a one). The voting results are maintained during the processing of a single routeword so that fabrics that mismatch will continue to mismatch. The lowest numbered fabric which matched every cycle is passed forward to the Data Delay FIFO along with a vector of mismatches.

The voter becomes out-of-sync if before reaching the end of a routeword all fabrics have a mismatch. The voter requires an IDLE on the SOB to re-sync to the incoming routeword stream as it provides a known packet boundary. The Data Delay FIFO must also flush all data received since the end of the last successfully voted routeword.

In OC192c, each Unstriper receives the same route word bits after routeword exchange, so it can perform local comparison of route word data.

In OC192c mode each Unstriper only receivers a portion of the switch 10 routeword. In order to properly determine needed values including the locatoin of the last valid byte each Unstriper exchanges its portion of the routeword with the other Unstripers.

All fields within the switch 10 routword are relevant except the EOP field. In particular the SOP field occurring as the first non-zero even-numbered bit signals the start of a Switch Routeword. The PT field designates whether the transfer is a packet or a cell. This is only significant when transmitting the received data on the BOB. The CONN field is only important for Path Error Cell identification (bit 0 non-zero and bit 25 zero) and for Unicast/Multicast context identification (bit 25). The NF field indicates the number of fabrics over which the transfer was sriped which is absolutely necessary for unstriping the transfer. Finally the Stop/Final variable length encoding which is used to determine the length of the transfer and whether it is a final fragment or not.

One of the most important characteristics of the Switch Routeword is that it encodes the length of the transfer in bytes. The parser determines the length and transmits it with the fully parsed routeword to the Data Delay FIFO.

The Switch Routeword contains a parity bit which respresents the odd parity computed over the first 32 bits of the routeword. If the value parsed from the routeword is not the same as the value obtained by applying the parity function to the first 32 bits received then a Routeword Parity Error is signaled causing the Routeword Parity Error Count register to be incremented. Transfers are not dropped immediately if there is a routeword parity error. The transfer is allowed to proceed but the error is sent with the transfer to ensure that it is eventually dropped.

The NF field of the routeword has to be consistent with the configuration of the Unstriper if this isn't the case then an error is signaled causing the Routeword NF Error Count register to be incremented for each such routeword received.

The Unstriper takes the NF field from the switch routeword and the parity bits (fabric 0) and forms NF+1 output streams with the N input streams of data based on each of the input data streams potentially having a problem. Each resulting data stream is passed to a dedicated checksum verifier that checks whether the data stream is valid.

The data checking function will also form a routeword valid bit for each of the data streams by ORing all of the routeword valid bits for all utilized input streams.

Data checking is performed over an entire packet with errors being reported only once for the affected packet.

The data for any single fabric 14 may be regenerated by replacing the fabric 14 data with the parity fabric 14 data and computing a new parity fabric 14 value. The newly computed parity fabric 14 value should be identical to the original fabric 14 data that is being regenerated. If this is not the case then either the fabric 14 data is erroneous or some other fabric 14 (including the parity) is erroneous. The parity check compares the original data with the regenerated data and if there's a difference a parity error is signaled for the affected packet.

The data checking function forms a 16-bit checksum using the following algorithm.

1. The incoming bit stream is separated into 4 bit streams based on the bit number mod 4=a constant. Each bit stream will have an independent checking function implemented. This bit stream includes all data received for a packet or cell except the 16 -bit checksum at the end of the final fragment.
2. A standard 16-bit CRC function ($X^{16}+X^{12}+X^{5}+1$) is applied to each of the 4 data streams. The CRC is preset at the beginning of each packet or cell.
3. Four bits are selected from each of the resulting 4 CRCs and concatenated together to form the final 16-bit checksum. Each slice will use ((bit_number mod 4)*4+3 to (bit_number mod 4)*4.

For an input stream to pass the checksum as computed above must match the checksum extracted from the end of the packet/cell. The checksum algorithnm is defined in this way to ensure that OC192c can be supported with minimal overhead. Any CRC over all the data would require the exchange of up to 13 CRC terms per OC192c cell/packet time (which is 2 clock cycles). Since data checking is separate for each slice, the information which needs to be collected at the end is the pass/fail data from each of the 13 CRC functions in all 4 chips and then a final pass/fail can be constructed.

The output stream used will be the first output stream found which has a valid routeword and a valid checksum at the end of the packet or cell. Note that this will default to not using parity if the non-parity data is correct.

Routeword and data errors may both be present. If a routeword error occurs it invalidates the the input stream on which it occurred even if that stream passes all other tests. Any input combination that uses such a stream is also erroneous.

If the Data Delay FIFO is being backpressured by the Reassembly Buffers then the valid routewords obtained from the Routeword Voter have to be stored until the Data Delay FIFO is released. The Valid Routeword FIFO stores up to 128 routewords corresponding to the number of minimum length fragments that may be stored in the Data Delay FIFO in OC192c mode.

Until a complete fragment has been received it is necessary to retain all of the data associated with the routeword. The Data Delay FIFO stores the raw data from the transceivers until the stripe amount of the fragment has been determined from the routeword. If no valid routeword was received then the data in the Data Delay FIFO following the last valid routeword has to be skipped.

The Reassembly Buffer is where fragmented packets are reassembled prior to being reformatted for transmission on the BOB. There is a separate Reassembly Buffer for unicast and for multicast traffic since fragments from each context may be received interleaved. Each Reassembly Buffer must be large enough to store a single 64 KB packet plus additional storage to compensate for the Output Select latency following the Checksum Check.

The Output Select FIFO is sized to allow for one 64K packet followed by a stream of ATM cells or smallest possible packet size packets. The data stored in this FIFO is the combination of input data lanes to use in reconstructing the data. This FIFO is sized as 64K/52 bytes=1261 entries. Each entry has two fields: (1) a port select field and (2) a byte count. The port select field is 13 bits wide and indicates that the selected input ports to be used. The only values written with non-zero data will be for valid entries, so the output data select will first count ones and use that to figure out the width of each selected interface. The second field is a 16 bit byte count is stored in the FIFO to track packet size. (The actual needed size on this FIFO should actually be (64K–8K)/52 bytes or 1102 entries.) Actual grown size will probably be 1280 words (1K+256).

After the input combination is selected, the data for either a unicast or multicast context is converted from 3-byte to 4-byte cycles and stored in the BOB Data FIFO for the same context. The order in which the packet was selected determines the order in which it is transmitted on the BOB. This orders the packets by the arrival of their final fragments.

In OC192c mode, four Unstripers will get data in parallel. The four Unstripers will exchange routeword information on the cell receipt and also exchange end of packet information. After CRC checks, the pass/fail information will be passed from ==each slave Unstriper to the master Unstriper which will then make a decision on which lane is accepted across all chips and transmit that decision to each slave Unstriper.

Routeword exchange is used so that all four Unstripers have the complete routeword. Bits are voted locally in each Unstriper to see if they match. The resulting bits out of routeword voting are passed to all Unstripers on a clock cycle by clock cycle basis. Each Unstriper starts transmitting and flagging routeword exchange at the receipt of a synch pulse on the backplane and data is exchanged every clock cycle thereafter until the next resynch event.

After routeword exchange, all four Unstripers have the entire fabric routeword.

| Pin Name | Number of copies | Function |
| --- | --- | --- |
| RW_SYNC_in(2:0) | 1 | 1 cycle pulse to indicate a synch pulse. All sync pulses are lined up to form valid routewords. |
| RW_SYNC_out | 1 | Gives indication that a sync pulse was received and routeword data will start to follow. |
| RW_out(3:0) | 1 | Routeword data output to each Unstriper |
| RW_in(3:0) | 3 | Gives the incoming routeword data from the each of the other Unstripers. |
| RW_CLK_in(2:0) | 1 | Clock for the routeword/sync in bits from each Unstriper. |
| RW_CLK_out | 3 | Clock for outgoing routeword/sync indication. |

The parity exchange bus is used to communicate parity information between the Unstripers. For certain stripe amounts, the parity exchange bus must communciate certain data bits (or the exclusive-or of certain data bits) between Unstripers. The Parity Exchange bus enables each Unstriper to send 8-bits of data to each of the other Unstripers each clock cycle.

| Pin Name | Number of copies | Function |
| --- | --- | --- |
| PE_SOP(2:0) | 1 | 1 cycle pulse to indicate to advance to the next cell/packet. |
| PE_CLK_in(2:0) | 1 | Each chip receives a clock for the associated SOP signal. Note that the SOP is multidropped, the clock is not. (Each chip drives 3 copies of its clock, so it has 3 outputs and 3 inputs). |
| PE_CLK_out | 3 | Clock sent out with each lane of data to the other Unstripers. |
| PE_VALID_in(2:0) | 1 | When asserted indicates that the other inputs contain valid data. |
| PE_VALID_out | 1 | Asserted to indicate that the other outputs contain valid data. |
| PE_DATA_out(15:0) | 3 | Exchanges the bits necessary for parity calculation. |

-continued

| Pin Name | Number of copies | Function |
|---|---|---|
| PE_DATA_in(15:0) | 3 | Exact exchange depends on the number of fabrics. Each chip has an output 16-bit data bus for every other Unstriper. The exact data exchanged on these busses depends on the stripe amount. Each Unstriper will start driving data at the same time as PE_SOP. Received parity data from each Unstriper. This data is synchronous with the corresponding PE_CLK_in. |

The error exchange bus allows three chips to communicate to a master the individual pass/fail results of the thirteen CRCs run by the chip and an indication of a parity error in the incoming data. The master combines the results of all of the chips together into one passing lane and signals the passing lane on the CRC selection pins. Note that there are only two valid passing configurations for any given packet. Either one CRC can pass and all others fail or all CRCs can pass.

The individual fields of this bus are given in the table below.

| Label | Direction | Function |
|---|---|---|
| EE_Parity | Slave-1 bit output<br>Master-3 bit input | Driven low to indicate a parity error. Valid at the same time as CRC results. |
| EE_CRC (3:0) | Slave-4 bit output<br>Master-12 bit input | Slave-drives:<br>"1111" = idle<br>"1110" = all CRCs pass<br>"1101" = drop<br>"0000"–"1100" = passing input combination<br>Note that no drop will occur until the output select signals a drop. |
| EE_Valid | Slave-1 bit output<br>Master-3 bit input/1 bit output | Gives the source clock for the outputs running between chips. Each chip will drive its EE_CRC and EE_Parity bits based on its local clock and then ship all of these to the other sources. |
| EE_OutSel(3:0) | Slave-4 bit input<br>Master-4 bit output | Master-drives:<br>"1111" = packet should be trapped<br>"1110" = idle<br>"1101" = drop<br>"0000"–"1100" for a valid output select. |
| EE_Clk | Slave-1 bit output<br>Master-3 bit output/3 bit input | Clock signal for error data or output select. |

The master/slave configuration is based on the relative chip id of the chip in the chipset. Chip 0 is treated as the master and chips 1, 2, and 3 are treated as slaves. Chip 0 is responsible for enforcing the trap condition in OC192c operation and will maintain the error counters and generate any error conditions due to interrupts exceeding thresholds.

The SOP/C Synchronization Bus is provided to minimize the skew of the BOB SOP/C signals coming from each Unstriper. Each Unstriper sends its BOB_SOP_C signal to each of the other Unsripers and receives theirs. The packet is transmitted on the cycle following the receipt of all of the SOP/Cs. If all of the SOP/Cs are not received within the allotted time the SOP/C Sync Err bit is asserted in the Main Status Register. Note that these signals are not source synchronous.

The Unstripers are connected in a bit interleaved fashion 55 similar to the Stripers in OC192c mode. One pin is used to indicate from the master to the three slaves that a new packet/cell is about to be started. This signal is asserted 3 clocks before the start of the data. This signal is synchronous with the output clock domain. The signal is driven to a one to indicate the start 60 of a packet, driven to a zero to indicate no start. Three clock cycles after it appears on the external net, the data will be driven onto the output bus to the memory controller.

The Unstriper provides the capability to terminate injected cells/packets which are used to help isolate any error conditions present in the switch 10. On receipt of these special cells or packets, the Unstriper will process them conventionally, except that they are not actually passed to the output. Whenever a cell or packet is received which is identified as a path error cell, its egress routeword is trapped along with an indication if the cell was received without error or exactly where the error location was seen. Termination cells are flagged as unicast cells with bit 0 of the fabric 14 connection number equal to a one. A FIFO of the routeword data of termination cells received is maintained by the Unstriper. When the number of FIFO entries exceeds a threshold, an interrupt is generated.

In addition to trapping routewords for the path error cells, the Unstriper can also optionally trap the routewords for any erroneous cells.

The FIFO is constructed to be 256 entries deep. Overflows are dropped on the write side of the FIFO.

The assignment of data bits to fabrics is done in the context of a bit stream view of the data. The data is viewed as being broken into blocks of 48 bits and assignment of data bits to fabrics is done within the 48-bit blocks. A start of packet always starts a new 48-bit block. Striping is defined as the mechanism that assigns the bit streams to the backplane bus bits. Striping is defined to meet the following criteria:

1. OC48 data cannot have more than 8 bits of pad required on the backplane bus. A bit assignment which has all groups of 12 bits transmitted on the same clock cycle will satisfy this property. For example, this states that for data bits 0:35, bits 0:11 are transmitted on cycle 1, 12:23 on cycle 2 and 24:35 on cycle 3. The other way to approach this would be to allow for shifts within a byte of data. For example bit 9 and bit 13 could shift positions because bit 9 and bit 15 are part of the same byte, so if one is used the other must also be used.
2. OC192 data cannot have more than 40 bits of pad required for the backplane bus. Note that this is actually a subset of #1 since this requires that all groups of 48 are transmitted on the same clock cycle for the backplane bus.
3. The striping definition must not require chip/chip communication for data for OC192 operation and the backplane busses must exist largely unchanged from OC192 and OC48. The assignment of bits to the fabric 14, the destination fabric 14 for the first bit from different stripers must rotate among the fabrics present in the switch 10.
2. Each row in the table will have the same number of bits going to each fabric 14. This will satisfy constraint number 3 and 4.
3. The bits used for OC48 striping and OC192 striping will be the same. This allows the aggregator 32 to convert the streams to one universal stream for the use on the fabric 14.

The following gives assignments for each of the fabric 14 configurations which satisfy these properties. The parity data which is transmitted is documented in the context of a 96 bit frame. This is to allow for parity exchange between the chips at 125 MHz.

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F0a(1) | F0a(2) | F0a(3) | F0a(4) | F0a(5) | F0a(6) | F0a(7) | F0a(8) | F0a(9) | F0a(10) | F0a(11) |
| Bit | 1 | 5 | 9 | 13 | 17 | 21 | 25 | 29 | 33 | 37 | 41 | 45 |
| BP bus | F0b(0) | F0b(1) | F0b(2) | F0b(3) | F0b(4) | F0b(5) | F0b(6) | F0b(7) | F0b(8) | F0b(9) | F0b(10) | F0b(11) |
| Bit | 2 | 6 | 10 | 14 | 18 | 22 | 26 | 30 | 34 | 38 | 42 | 46 |
| BP bus | F0c(0) | F0c(1) | F0c(2) | F0c(3) | F0c(4) | F0c(5) | F0c(6) | F0c(7) | F0c(8) | F0c(9) | F0c(10) | F0c(11) |
| Bit | 3 | 7 | 11 | 15 | 19 | 23 | 27 | 31 | 35 | 39 | 43 | 47 |
| BP bus | F0d(0) | F0d(1) | F0d(2) | F0d(3) | F0d(4) | F0d(5) | F0d(6) | F0d(7) | F0d(8) | F0d(9) | F0d(10) | F0d(11) | stripers must allow for the same number of bits to go to each fabric 14 from each striper in OC192 mode.
4. All fabrics must have exactly the same bits going to the memory controllers for either an OC48 or an OC192 input port. On the output side, the same bits leave the memory controller and must be convertible into the backplane bus required for either an OC48 or an OC192 output port.

The striping function will be defined by constructing an OC192 solution and modifying OC48 behavior to match the OC192 solution. For each of the striping configurations, a table will be constructed which will give the bit assignments for striping. Each row of this table represents the bits that are connected to the stripers in OC192 mode. Each set of 3 columns in the table represent the bits sent during one cycle of OC48 operation. The following properties will be true for each table:
1. Each 12-bit sub-block will have the same number of bits going to each fabric 14, which will satisfy constraints 1 and 2. The 12-bit sub-block is composed of 3 columns of all four rows. In order to satisfy the 12 bit sub-block having the same number of bits to each The following table shows the bit order transmitted for OC48 operation.

| Fabric (bit) | Cycle 0 | Cycle 1 | Cycle 2 | Cycle 3 |
|---|---|---|---|---|
| F0(0) | 0 | cycle 0 + 24 | cycle 0 + 24 | cycle 0 + 24 |
| F0(1) | 1 | | | |
| F0(2) | 2 | | | |
| F0(3) | 3 | | | |
| F0(4) | 4 | | | |
| F0(5) | 5 | | | |
| F0(6) | 6 | | | |
| F0(7) | 7 | | | |
| F0(8) | 8 | | | |
| F0(9) | 9 | | | |
| F0(10) | 10 | | | |
| F0(11) | 11 | | | |

The parity data is identical to the transmit data.

The following table gives the fabric assignments for each block 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F0a(1) | F1a(1) | F0a(2) | F1a(2) | F0a(3) | F1a(3) | F0a(4) | F1a(4) | F0a(5) | F1a(5) |
| Bit | 1 | 5 | 9 | 13 | 17 | 21 | 25 | 29 | 33 | 37 | 41 | 45 |
| BP bus | F1b(0) | F0b(0) | F1b(1) | F0b(1) | F1b(2) | F0b(2) | F1b(3) | F0b(3) | F1b(4) | F0b(4) | F1b(5) | F0b(5) |
| Bit | 2 | 6 | 10 | 14 | 18 | 22 | 26 | 30 | 34 | 38 | 42 | 46 |
| BP bus | F0c(0) | F1c(0) | F0c(1) | F1c(1) | F0c(2) | F1c(2) | F0c(3) | F1c(3) | F0c(4) | F1c(4) | F0c(5) | F1c(5) |
| Bit | 3 | 7 | 11 | 15 | 19 | 23 | 27 | 31 | 35 | 39 | 43 | 47 |
| BP bus | F1d(0) | F0d(0) | F1d(1) | F0d(1) | F1d(2) | F0d(2) | F1d(3) | F0d(3) | F1d(4) | F0d(4) | F1d(5) | F0d(5) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | 13 | cycle 0 + 24 | cycle 1 + 24 |
| F0(1) | 2 | 15 | | |
| F0(2) | 5 | 16 | | |
| F0(3) | 7 | 18 | | |
| F0(4) | 8 | 21 | | |
| F0(5) | 10 | 23 | | |
| F1(0) | 1 | 12 | | |
| F1(1) | 3 | 14 | | |
| F1(2) | 4 | 17 | | |
| F1(3) | 6 | 19 | | |
| F1(4) | 9 | 20 | | |
| F1(5) | 11 | 22 | | |

| Bit | Transmit stripe | XOR bits |
|---|---|---|
| P0 | 0 | 0, 4 |
| P1 | 2 | 2, 6 |
| P2 | 1 | 1, 5 |
| P3 | 3 | 3, 7 |
| P4 | 0 | 8, 9 |
| P5 | 2 | 10, 11 |
| P6 | 1 | 13, 17 |
| P7 | 3 | 15, 19 |
| P8 | 0 | 16, 12 |
| P9 | 2 | 18, 14 |
| P10 | 1 | 21, 20 |
| P11 | 3 | 23, 22 |

Note that parity bits P12–P24 repeat the pattern of P0–P11 For generation of parity, 8 bits are exchanged between U0->U1 and U2->U3 for each 48 bit word, one bit in each direction. The following table shows the bits transmitted on each parity bus. Bits 8 through 15 of the exchange is obtained by adding 96 to each value below.

| From | To | Bit 7 | Bit 6 | Bit 5 | Bit 4 | Bit 3 | Bit 2 | Bit 1 | Bit 0 |
|---|---|---|---|---|---|---|---|---|---|
| 0 | 1 | 92 | P40 + 80 | 68 | P28 + 56 | 44 | P16 + 32 | 20 | P4 + 8 |
|   | 2 | | | | | | | | |
|   | 3 | | | | | | | | |
| 1 | 0 | P46 + 93 | 81 | P34 + 69 | 57 | P22 + 45 | 33 | P10 + 21 | 9 |
|   | 2 | | | | | | | | |
|   | 3 | | | | | | | | |
| 2 | 0 | | | | | | | | |
|   | 1 | | | | | | | | |
|   | 3 | 94 | P41 + 82 | 70 | P29 + 58 | 46 | P17 + 34 | 22 | P5 + 10 |
| 3 | 0 | | | | | | | | |
|   | 1 | | | | | | | | |
|   | 2 | P47 + 95 | 83 | P35 + 71 | 59 | P23 + 47 | 35 | P11 + 23 | 11 |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F0a(1) | F1a(1) | F2a(1) | F0a(2) | F1a(2) | F2a(2) | F0a(3) | F1a(3) | F2a(3) |
| Bit | 1 | 5 | 9 | 13 | 17 | 21 | 25 | 29 | 33 | 37 | 41 | 45 |
| BP bus | F2b(0) | F0b(0) | F1b(0) | F2b(1) | F0b(1) | F1b(1) | F2b(2) | F0b(2) | F1b(2) | F2b(3) | F0b(3) | F1b(3) |
| Bit | 2 | 6 | 10 | 14 | 18 | 22 | 26 | 30 | 34 | 38 | 42 | 46 |
| BP bus | F1c(0) | F2c(0) | F0c(0) | F1c(1) | F2c(1) | F0c(1) | F1c(2) | F2c(2) | F0c(2) | F1c(3) | F2c(3) | F0c(3) |
| Bit | 3 | 7 | 11 | 15 | 19 | 23 | 27 | 31 | 35 | 39 | 43 | 47 |
| BP bus | F0d(0) | F1d(0) | F2d(0) | F0d(1) | F1d(1) | F2d(1) | F0d(2) | F1d(2) | F2d(2) | F0d(3) | F1d(3) | F2d(3) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | cycle 0 + 12 | cycle 0 + 24 | cycle 0 + 36 |
| F0(1) | 3 | | | |
| F0(2) | 5 | | | |
| F0(3) | 10 | | | |
| F1(0) | 2 | | | |
| F1(1) | 4 | | | |
| F1(2) | 7 | | | |
| F1(3) | 9 | | | |
| F2(0) | 1 | | | |
| F2(1) | 6 | | | |
| F2(2) | 8 | | | |
| F2(3) | 11 | | | |

The parity calculation uses the following:

| Bit | Transmit stripe | XOR bits |
|---|---|---|
| P0 | 0 | 0, 4, 8 |
| P1 | 3 | 3, 7, 11 |
| P2 | 1 | 1, 5, 9 |
| P3 | 2 | 2, 6, 10 |
| P4 | 0 | 12, 16, 20 |
| P5 | 3 | 15, 19, 23 |
| P6 | 1 | 13, 17, 21 |
| P7 | 2 | 14, 18, 22 |

Note that parity bits P8–P15 repeat the pattern of P0–P11. Parity generation requires no exchange of bits for OC192c.

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F0a(1) | F1a(1) | F2a(1) | F3a(1) | F0a(2) | F1a(2) | F2a(2) | F3a(2) |
| Bit | 1 | 5 | 9 | 13 | 17 | 21 | 25 | 29 | 33 | 37 | 41 | 45 |
| BP bus | F3b(0) | F0b(0) | F1b(0) | F2b(0) | F3b(1) | F0b(1) | F1b(1) | F2b(1) | F3b(2) | F0b(2) | F1b(2) | F2b(2) |
| Bit | 2 | 6 | 10 | 14 | 18 | 22 | 26 | 30 | 34 | 38 | 42 | 46 |
| BP bus | F2c(0) | F3c(0) | F0c(0) | F1c(0) | F2c(1) | F3c(1) | F0c(1) | F1c(1) | F2c(2) | F3c(2) | F0c(2) | F1c(2) |
| Bit | 3 | 7 | 11 | 15 | 19 | 23 | 27 | 31 | 35 | 39 | 43 | 47 |
| BP bus | F1d(0) | F2d(0) | F3d(0) | F0d(0) | F1d(1) | F2d(1) | F3d(1) | F0d(1) | F1d(2) | F2d(2) | F3d(2) | F0d(2) |

The following table shows the bit order transmitted for OC48 operation.

| Fabric (bit) | Cycle 0 | Cycle 1 | Cycle 2 | Cycle 3 |
|---|---|---|---|---|
| F0(0) | 0 | 15 | 26 | 37 |
| F0(1) | 5 | 16 | 31 | 42 |
| F0(2) | 10 | 21 | 32 | 47 |
| F1(0) | 3 | 14 | 25 | 36 |
| F1(1) | 4 | 19 | 30 | 41 |
| F1(2) | 9 | 20 | 35 | 46 |
| F2(0) | 2 | 13 | 24 | 39 |
| F2(1) | 7 | 18 | 29 | 40 |
| F2(2) | 8 | 23 | 34 | 45 |
| F3(0) | 1 | 12 | 27 | 38 |
| F3(1) | 6 | 17 | 28 | 43 |
| F3(2) | 11 | 22 | 33 | 44 |

The parity calculation uses the following formulas:

| Bit | Transmit stripe | XOR bits |
|---|---|---|
| P0 | 0 | 0, 4, 8, 11 |
| P1 | 1 | 5, 9, 7, 1 |
| P2 | 2 | 10, 3, 2, 6 |
| P3 | 3 | 15, 19, 23, 22 |
| P4 | 0 | 16, 20, 18, 12 |
| P5 | 1 | 21, 14, 13, 17 |
| P6 | 2 | 26, 30, 34, 33 |
| P7 | 3 | 31, 35, 29, 27 |
| P8 | 0 | 32, 25, 24, 28 |
| P9 | 1 | 37, 41, 45, 44 |
| P10 | 2 | 42, 46, 40, 38 |
| P11 | 3 | 47, 36, 39, 43 |

The following table shows the bits transmitted on each parity bus. Bits 8 through 15 of the parity data are obtained by adding 96 to each of the values in the table.

| From | To | Bit 7 | Bit 6 | Bit 5 | Bit 4 | Bit 3 | Bit 2 | Bit 1 | Bit 0 |
|---|---|---|---|---|---|---|---|---|---|
| 0 | 1 | 92 | P20 + 72 + 76 + 80 | | | 44 | P8 + 24 + 28 + 32 | | |
| | 2 | 88 | | P16 + 60 + 64 + 68 | | 40 | | P4 + 12 + 16 + 20 | |
| | 3 | 84 | | | P12 + 56 + 52 + 48 | 36 | | | P0 + 0 + 4 + 8 |
| 1 | 0 | P21 + 85 + 89 + 93 | 73 | | | P9 + 37 + 41 + 45 | 25 | | |
| | 2 | | 81 | P17 + 69 + 61 + 65 | | | 33 | P5 + 21 + 13 + 17 | |
| | 3 | | 77 | | P13 + 49 + 53 + 57 | | 29 | | P1 + 1 + 5 + 9 |
| 2 | 0 | P22 + 86 + 90 + 94 | | 66 | | P10 + 38 + 42 + 46 | | 18 | |
| | 1 | | P18 + 74 + 78 + 82 | 62 | | | P6 + 26 + 30 + 34 | 14 | |
| | 3 | | | 70 | P14 + 50 + 54 + 58 | | | 22 | P2 + 2 + 6 + 10 |
| 3 | 0 | P23 + 87 + 91 + 95 | | | 59 | P11 + 39 + 43 + 47 | | | 11 |
| | 1 | | P19 + 75 + 79 + 83 | | 55 | | P7 + 27 + 31 + 35 | | 7 |
| | 2 | | | P15 + 63 + 67 + 71 | 51 | | | P3 + 15 + 19 + 23 | 3 |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F4a(0) | F5a(0) | F0a(1) | F1a(1) | F2a(1) | F3a(1) | F4a(1) | F5a(1) |
| Bit | 1 | 5 | 9 | 13 | 17 | 21 | 25 | 29 | 33 | 37 | 41 | 45 |
| BP bus | F3b(0) | F4b(0) | F5b(0) | F0b(0) | F1b(0) | F2b(0) | F3b(1) | F4b(1) | F5b(1) | F0b(1) | F1b(1) | F2b(1) |
| Bit | 2 | 6 | 10 | 14 | 18 | 22 | 26 | 30 | 34 | 38 | 42 | 46 |
| BP bus | F0c(0) | F1c(0) | F2c(0) | F3c(0) | F4c(0) | F5c(0) | F0c01) | F1c(1) | F2c(1) | F3c(1) | F4c(1) | F5c(1) |
| Bit | 3 | 7 | 11 | 15 | 19 | 23 | 27 | 31 | 35 | 39 | 43 | 47 |
| BP bus | F3d(0) | F4d(0) | F5d(0) | F0d(0) | F1d(0) | F2d(0) | F3d(1) | F4d(1) | F5d(1) | F0d(1) | F1d(1) | F2d(1) |

The following table shows the bit order transmitted for OC48 operation.

| Fabric (bit) | Cycle 0 | Cycle 1 |
|---|---|---|
| F0(0) | 0 | 13 |
| F0(1) | 2 | 15 |
| F1(0) | 4 | 17 |
| F1(1) | 6 | 19 |
| F2(0) | 8 | 21 |
| F2(1) | 10 | 23 |
| F3(0) | 1 | 12 |
| F3(1) | 3 | 14 |
| F4(0) | 5 | 16 |
| F4(1) | 7 | 18 |
| F5(0) | 9 | 20 |
| F5(1) | 11 | 22 |

The parity calculation uses the following formulas:

| Bit | Transmit stripe | XOR bits |
|---|---|---|
| P0 | 0 | 0, 4, 8, 1, 5, 9 |
| P1 | 2 | 2, 6, 10, 3, 7, 11 |
| P2 | 1 | 13, 17, 21, 12, 16, 20 |
| P3 | 3 | 15, 19, 23, 14, 18, 22 |

Note that parity bits P4–P8 repeat the pattern of P0-P3+24. The following table shows the bits on each parity bus. Bits 8 through 15 of the parity bus are obtained by adding 96 to each value in the table.

| From | To | Bit 7 | Bit 6 | Bit 5 | Bit 4 | Bit 3 | Bit 2 | Bit 1 | Bit 0 |
|---|---|---|---|---|---|---|---|---|---|
| 0 | 1 | 84 + 88 + 92 | P12 + 72 + 76 + 80 | 60 + 64 + 68 | P8 + 48 + 52 + 56 | 36 + 40 + 44 | P4 + 24 + 28 + 32 | 12 + 16 + 20 | P0 + 0 + 4 + 8 |
|  | 2 |  |  |  |  |  |  |  |  |
|  | 3 |  |  |  |  |  |  |  |  |
| 1 | 0 | P15 + 85 + 89 + 93 | 73 + 77 + 81 | P11 + 61 + 65 + 69 | 49 + 53 + 57 | P7 + 37 + 41 + 45 | 25 + 29 + 33 | P3 + 13 + 17 + 21 | 1 + 5 + 9 |
|  | 2 |  |  |  |  |  |  |  |  |
|  | 3 |  |  |  |  |  |  |  |  |
| 2 | 0 |  |  |  |  |  |  |  |  |
|  | 1 |  |  |  |  |  |  |  |  |
|  | 3 | 86 + 90 + 94 | P13 + 74 + 78 + 82 | 62 + 66 + 70 | P9 + 50 + 54 + 58 | 38 + 42 + 46 | P5 + 26 + 30 + 34 | 14 + 18 + 22 | P1 + 2 + 6 + 10 |
| 3 | 0 |  |  |  |  |  |  |  |  |
|  | 1 |  |  |  |  |  |  |  |  |
|  | 2 | P14 + 87 + 91 + 95 | 75 + 79 + 83 | P10 + 63 + 67 + 71 | 51 + 55 + 59 | P6 + 39 + 43 + 47 | 27 + 31 + 35 | P2 + 15 + 19 + 23 | 3 + 7 + 11 |

The following table gives the fabric assignments for each block of 48 bits and the output bus assignments for OC192c operation.

| Bit | 0 | 4 | 8 | 12 | 16 | 20 | 24 | 28 | 32 | 36 | 40 | 44 |
|---|---|---|---|---|---|---|---|---|---|---|---|---|
| BP bus | F0a(0) | F1a(0) | F2a(0) | F3a(0) | F4a(0) | F5a(0) | F6a(0) | F7a(0) | F8a(0) | F9a(0) | F10a(0) | F11a(0) |
| Bit | 1 | 5 | 9 | 13 | 17 | 21 | 25 | 29 | 33 | 37 | 41 | 45 |
| BP bus | F3b(0) | F4b(0) | F5b(0) | F6b(0) | F7b(0) | F8b(0) | F9b(0) | F10b(0) | F11b(0) | F0b(0) | F1b(0) | F2b(0) |
| Bit | 2 | 6 | 10 | 14 | 18 | 22 | 26 | 30 | 34 | 38 | 42 | 46 |
| BP bus | F6c(0) | F7c(0) | F8c(0) | F9c(0) | F10c(0) | F11c(0) | F0c(0) | F1c(0) | F2c(0) | F3c(0) | F4c(0) | F5c(0) |
| Bit | 3 | 7 | 11 | 15 | 19 | 23 | 27 | 31 | 35 | 39 | 43 | 47 |
| BP bus | F9d(0) | F10d(0) | F11d(0) | F0d(0) | F1d(0) | F2d(0) | F3d(0) | F4d(0) | F5d(0) | F6d(0) | F7d(0) | F8d(0) |

The following table shows the bit order transmitted for OC48 operation.

| Fabric (bit | Cycle 0 | Cycle 1 | Cycle 2 | Cycle 3 |
|---|---|---|---|---|
| F0(0) | 0 | 15 | 26 | 37 |
| F1(0) | 4 | 19 | 30 | 41 |
| F2(0) | 8 | 23 | 34 | 45 |
| F3(0) | 1 | 12 | 27 | 38 |
| F4(0) | 5 | 16 | 31 | 42 |
| F5(0) | 9 | 20 | 35 | 46 |
| F6(0) | 2 | 13 | 24 | 39 |
| F7(0) | 6 | 17 | 28 | 43 |
| F8(0) | 10 | 21 | 32 | 47 |
| F9(0) | 3 | 14 | 25 | 36 |
| F10(0) | 7 | 18 | 29 | 40 |
| F11(0) | 11 | 22 | 33 | 44 |

The parity calculation uses the following formulas and the following aggregator 32 read order

| Bit | Transmit stripe | XOR bits |
|---|---|---|
| P0 | 0 | 0–11 |
| P1 | 1 | 12–23 |
| P2 | 2 | 24–35 |
| P3 | 3 | 36–47 |

The following table shows the bits transmitted on each parity bus. Bits 8 through 15 of the parity bus are obtained by adding 96 to each value in the table.

| From | To | Bit 7 | Bit 6 | Bit 5 | Bit 4 | Bit 3 | Bit 2 | Bit 1 | Bit 0 |
|---|---|---|---|---|---|---|---|---|---|
| 0 | 1 | 84 + 88 + 92 | 72 + 76 + 80 | 60 + 64 + 68 | P4 + 48 + 52 + 56 | 36 + 40 + 44 | 24 + 28 + 32 | 12 + 16 + 20 | P0 + 0 + 4 + 8 |
|  | 2 | 84 + 88 + 92 | 72 + 76 + 80 | 60 + 64 + 68 | P4 + 48 + 52 + 56 | 36 + 40 + 44 | 24 + 28 + 32 | 12 + 16 + 20 | P0 + 0 + 4 + 8 |
|  | 3 | 84 + 88 + 92 | 72 + 76 + 80 | 60 + 64 + 68 | P4 + 48 + 52 + 56 | 36 + 40 + 44 | 24 + 28 + 32 | 12 + 16 + 20 | P0 + 0 + 4 + 8 |
| 1 | 0 | 85 + 89 + 93 | 73 + 77 + 81 | P5 + 61 + 65 + 69 | 49 + 53 + 57 | 37 + 41 + 45 | 25 + 29 + 33 | P1 + 13 + 17 + 21 | 1 + 5 + 9 |

-continued

| From | To | Bit 7 | Bit 6 | Bit 5 | Bit 4 | Bit 3 | Bit 2 | Bit 1 | Bit 0 |
|---|---|---|---|---|---|---|---|---|---|
| | 2 | 85 + 89 + 93 | 73 + 77 + 81 | P5 + 61 + 65 + 69 | 49 + 53 + 57 | 37 + 41 + 45 | 25 + 29 + 33 | P1 + 13 + 17 + 21 | 1 + 5 + 9 |
| | 3 | 85 + 89 + 93 | 73 + 77 + 81 | P5 + 61 + 65 + 69 | 49 + 53 + 57 | 37 + 41 + 45 | 25 + 29 + 33 | P1 + 13 + 17 + 21 | 1 + 5 + 9 |
| 2 | 0 | 86 + 90 + 94 | P6 + 74 + 78 + 82 | 62 + 66 + 70 | 50 + 54 + 58 | 38 + 42 + 46 | P2 + 26 + 30 + 34 | 14 + 18 + 22 | 2 + 6 + 10 |
| | 1 | 86 + 90 + 94 | P6 + 74 + 78 + 82 | 62 + 66 + 70 | 50 + 54 + 58 | 38 + 42 + 46 | P2 + 26 + 30 + 34 | 14 + 18 + 22 | 2 + 6 + 10 |
| | 3 | 86 + 90 + 94 | P6 + 74 + 78 + 82 | 62 + 66 + 70 | 50 + 54 + 58 | 38 + 42 + 46 | P2 + 26 + 30 + 34 | 14 + 18 + 22 | 2 + 6 + 10 |
| 3 | 0 | P7 + 87 + 91 + 95 | 75 + 79 + 83 | 63 + 67 + 71 | 51 + 55 + 59 | P3 + 39 + 43 + 47 | 27 + 31 + 35 | 15 + 19 + 23 | 3 + 7 + 11 |
| | 1 | P7 + 87 + 91 + 95 | 75 + 79 + 83 | 63 + 67 + 71 | 51 + 55 + 59 | P3 + 39 + 43 + 47 | 27 + 31 + 35 | 15 + 19 + 23 | 3 + 7 + 11 |
| | 2 | P7 + 87 + 91 + 95 | 75 + 79 + 83 | 63 + 67 + 71 | 51 + 55 + 59 | P3 + 39 + 43 + 47 | 27 + 31 + 35 | 15 + 19 + 23 | 3 + 7 + 11 |

When the Unstriper receives a Packet Abort K-character over the SOB, the Unstriper should abandon all packets that can't be completed with fragments that have already been received (in or after the Data Delay FIFO/RW Voter). No indication is provided when a packet has been dropped as a result of receiving a Packet Abort. The Unstriper expects that at least 12-Idle K-characters are received following the Packet Abort K-character as a means of allowing the Unstriper to re-sync.

Given a potential mismatch between the SOB bandwidth and the BOB bandwidth and the potential for the BOB to be backpressured from downstream it is possible that all of the storage within the Unstriper is consumed. When the number of used slots in the Data Delay FIFO is greater than the contents of the Backpressure Threshold Register the Unstriper asserts the US_BP output signal. It is expected that the Separators will stop sending transfers at the next fragment boundary after receiving this signal. If any fragments are received when the Data Delay FIFO is full they are dropped. If any final fragments are lost then Unstriper will increment the FIFO Full Packet Drop Count register.

Initial values of all register (reset state) is zero unless documented otherwise.

The version number register is a read only register which allows software to see what the version number of the chip is.

| Bit | Label | Function |
|---|---|---|
| 31:16 | Unused | |
| 15:12 | Version number | Version number of the chip |
| 11:0 | ASIC ID | ASIC ID |

The main control register controls the configuration of the chip.

| Bit | Label | Function |
|---|---|---|
| 31:14 | Unused | |
| 13 | Disable term | Set this bit to a one to disable trapping test cells into the terminate FIFO, set to a zero to enable trapping test cells into the terminate FIFO and not forwarding the cells to the output stage. |
| 12 | Unused | |
| 11 | Trap corrupts | Set this bit to a one to trap all corrupt cell information into the terminate FIFO, set to a zero to only trap test cells terminated in the unstriper. |
| 10 | BOB_valid polarity | '1' = BOB_VALID is active-high.<br>'0' = BOB_VALID is active-low. |
| 9 | Bob packet wait | Determines the latency between the assertion of the BOB_BP_L signal and the deassertion of the BOB_VALID signal<br>'1' = BOB is idled immediately.<br>'0' = BOB is idled at the end of the next packet/cell. |
| 8 | SOP polarity | '1' = SOP is active-high.<br>'0' = SOP is active-low.<br>Note for ATM blades, this bit should be a zero. |
| 7 | Unused | |
| 5 | OC192c enable | Returns the value present on the OC48/oc192 pin.<br>'1' = OC192c<br>'0' = OC48 |
| 4:3 | OC192c chip id | Returns the value of the CHIP_MODE (1:0) pins. |
| 2:0 | Number of Fabrics | The number of fabrics in the system configuration. The Unstriper can handle data striped to two adjacent fabric amounts simultaneously.<br>"000" = 1/2<br>"001" = 2/3 |

-continued

| Bit | Label | Function |
|---|---|---|
| | | "010" = 3/4 |
| | | "01 1" = 4/6-fast |
| | | "100" = 6-fast/6-slow |
| | | "101" = 6-slow/12 |
| | | "110" = 6-slow/12 |

This register contains a status information to report errors. Reading bits automatically causes them to clear. Status bits will be reasserted after the source has cleared its signal and then is reasserted.

| Bit | Label | Function |
|---|---|---|
| 31:10 | Unused | |
| 9 | Routeword exchange bus sync error | A synchronization error occurred (elastic buffer overflow) on the Routeword Exchange Bus. |
| 8 | Parity exchange bus sync error | A synchronization error occurred (elastic buffer overflow) on the Parity Exchange Bus. |
| 7 | Error exchange bus sync error | A synchronization error occurred (elastic buffer overflow) on the Error Exchange Bus. |
| 6 | BOB SOP/C Sync bus sync error | A synchronization error occurred (elastic buffer overflow) on the BOB SOP/C Sync Bus. |
| 5 | Transceiver error above threshold | One or more of the Gigabit Ethernet transceivers (SOB) error counters has exceeded the programmed threshold. The Transceiver Error Status register must be read to clear this bit. |
| 4 | Terminated FIFO length above threshold | The number of terminated cells (used for switch path fault isolation) has exceeded the programmed threshold. |
| 3 | Error counter above threshold | An error counter has exceeded the programmed threshold. |
| 2 | Synch error | An error in the synchronization logic occurred. |
| 1 | FIFO full drop occurred | This bit is set to a one when a cell or packet drop has occurred due to an internal FIFO being full. |
| 0 | Cell Trapped | This bit is set to a one when a cell trap has been triggered. This bit is cleared by writing a one back to this bit. |

This register enables an interrupt to be generated when the corresponding bit in the Status Register has been set.

| Bit | Label | Function |
|---|---|---|
| 31:12 | Unused | |
| 11 | Routeword exchange bus sync error | A synchronization error occurred (elastic buffer overflow) on the Routeword Exchange Bus. |
| 10 | Parity exchange bus sync error | A synchronization error occurred (elastic buffer overflow) on the Parity Exchange Bus. |
| 9 | Error exchange bus sync error | A synchronization error occurred (elastic buffer overflow) on the Error Exchange Bus. |
| 8 | BOB SOP/C Sync bus sync error | A synchronization error occurred (elastic buffer overflow) on the BOB SOP/C Sync Bus. |
| 7 | Transceiver error above threshold | One or more of the Gigabit Ethernet transceivers (SOB) error counters has exceeded the programmed threshold. The Transceiver Error Status register must be read to clear this bit. |
| 6 | Terminated cells over threshold | Set this bit to a one to enable the interrupt assertion due to the number of terminated cells exceeding a threshold being held in the terminated cell FIFO. |
| 5 | Parity error | Set this bit to a one to enable the interrupt assertion due to a parity threshold exceeded condition. Set this bit to a zero to disable the interrupt. |
| 4 | Checksum error | Set this bit to a one to enable the interrupt assertion due to a checksum threshold exceeded condition. Set this bit to a zero to disable the interrupt. |
| 3 | Routeword error | Set this bit to a one to enable the interrupt assertion due to a routeword threshold exceeded condition. Set this bit to a zero to disable the interrupt. |

-continued

| Bit | Label | Function |
|---|---|---|
| 2 | Synch Error | Set to bit to a one to generate an interrupt on the assertion of an error in the synchronizer. |
| 1 | FIFO full | Set this bit to a one to enable an interrupt on the dropping of traffic due to any FIFO overflow in the chip. |
| 0 | Cell Trapped | Set this bit to a one to enable an interrupt if a cell trap executed. |

The Input enable register controls the ports enabled for the input busses on the device. Note that this is used to override the normal hardware based handshaking on the interfaces.

| Bit | Label | Function |
|---|---|---|
| 12:0 | Input Enable | Set each bit x to a one to enable input bus x for operation. Note that bit 12 is the parity fabric, bits 0–11 are for fabrics 0–11. |

Disabling an input causes the routeword from that lane to automatically be handled as if it mismatches but disables any errors from being counted in lanes which would have used the masked data.

This register is used to control the reading of cells from the data FIFO and pushing the data out the DIN_MC bus. Based on internal error conditions, it can also be used to stop reading output based on certain error conditions to allow debugging to take place.

| Bit | Label | Function |
|---|---|---|
| 31:5 | Unused | |
| 4 | OC192c driven enables | Enable drivers for the OC192c configuration. |
| 3 | Trap on parity | Set this bit to a one to trap a cell/packet which has a parity error |
| 2 | Trap on header | Set this bit to a one to trap a cell/packet which has a header error. |
| 1 | Trap on checksum | Set this bit to a one to trap a cell/packet which fails checksum. |
| 0 | BOB_enable | Set this bit to a one to enable writes to the DIN_MC bus |

The Backpressure Threshold is used to determine when the Unstriper asserts UNS_BP based on the number of entries used in the Data Delay FIFO. When the threshold is exceeded the UNS_BP signal is asserted until the number of used entries is below the threshold. The Separators are expected to stop sending data at a fragment boundary.

| Bit | Label | Function |
|---|---|---|
| 7:0 | Threshold | Number of used entries in the Data Delay FIFO before the UNS_BP signal is asserted. The default value is 220 corresponding to two minimum length packets in 240G Slow mode. |

The Unstriper provides a software interface to the data FIFO as a fault isolation aid. The usage of these registers allows for reads to be done from the FIFO head, and writes to the done to the tail of the FIFO.

To read a cell/packet from the FIFO, perform the following actions:
1. Initialize the Output Enable/Trap enable register to stop reads on the desired condition. This will freeze the DIN_MC interface at that start of cell/packet.
2. Wait for the Trap Valid bit to be set in the main status register.
3. Start reading. The first read should be done with the Data FIFO first read register. This will cause the data to be read from the current read pointer.
4. Perform subsequent reads using the data FIFO increment read. This will cause the read pointer to be incremented by one byte for each read operation and the read performed.

Note that this read is not destructive and the data will be read out of the FIFO to the DIN_MC bus when the trap is cleared.

This register selects the FIFO which the FIFO data registers read/write.

| Bit | Label | Function |
|---|---|---|
| 31:2 | Unused | |
| 1:0 | FIFO select | Selects the FIFO. The following encoding is used: 00-Data FIFO 01-Parity FIFO 10-output delay FIFO |

This register reads the byte at the head of the data FIFO.

| Bit | Label | Function |
|---|---|---|
| 31:9 | Unused | |
| 8 | EOP | Bit is a one for EOP, zero for non-EOP. |
| 7:0 | Read data | Read of this register returns the first byte from the data FIFO. A write to this register modifies the first address in the data FIFO |

This register is used to read/write the next byte from the FIFO. The effect of this read is to advance the processor read address in the FIFO and to read the resulting data byte. Writing to this register writes the next byte of data. Register format is identical to Data FIFO first read.

The Unstriper maintains a set of error counters. These counters count the occurrences of specific errors within a programmable time window. When counter values exceed a programmed threshold for each counter type, an interrupt is generated and error bits set in the main status register. Two main event types are counted on a per lane basis: (1) header errors and (2) invalid checksums.

Counter resets are done via periodic software polling. It is the intent of the design to have the software read interval reasonably high (0.5 seconds or so). In the event of an interrupt, it is the responsibility of software to find and reset the counter which caused the interrupt condition.

All internal error counters are 16 bits since they are in the device for failure isolation. Counters will not overflow but will stay at 0xFFFF until they are read. Counters automatically clear on reads. It is assumed that periodically the SCP will read the unstriper error counters to maintain longer interval error counts. Interrupts are present to keep the frequency of the required counter reads low (one the order of 100 mS–1 second). The unstriper will not reset counters at all without software intervention.

The error count status register summarizes the current threshold comparison for all error counts. If any of these bits are set, an associated bit is set. To clear a bit in the error count status register, write a 1 back to the location(s) to be cleared. Any bits which have a zero written back will remain unchanged.

| Bit | Label | Function |
| --- | --- | --- |
| 28 | Routeword NE Error Count above threshold | This bit is set when the value in the Routeword NE Error Count register is greater than the value in the Routeword NF Error Threshold register |
| 27 | Routeword Parity Error Count above threshld | This bit is set when the value in the Routeword Parity Error Count register is greater than the value in the Routeword Parity Error Threshold register |
| 26 | Parity count above threshold | This bit is set if the number of parity errors exceeds the parity error threshold. |
| 25:13 | Routeword count above threshold | Each bit of this field is set to a one if the routeword errors of one input interface has its error count above the threshold for routeword errors. |
| 12:0 | Checksum count above threshold | Each bit of this field is set to a one if the checksum errors of one rebuilt data stream has its error count above the threshold for checksum errors. |

The Checksum Error Threshold controls the assertion of an error indication for checksum errors. When the number of checksum errors for any lane exceeds this register, an error condition is signaled in the main status register and an interrupt may be generated.

| Bit | Label | Function |
| --- | --- | --- |
| 15:0 | Threshold | Threshold value. This is a unsigned 16 bit quantity, comparison is # errors > Threshold. |

The Routeword Error Threshold controls the assertion of an error indication for routeword errors. When the number of routeword errors for any lane exceeds this register, an error condition is signaled in the main status register and an interrupt may be generated.

| Bit | Label | Function |
| --- | --- | --- |
| 15:0 | Threshold | Threshold value. This is a unsigned 16 bit quantity, comparison is # errors > Threshold. |

The Parity Error Threshold controls the assertion of an error indication for parity errors. When the number of parity errors exceeds this register, an error condition is signaled in the main status register and an interrupt may be generated.

| Bit | Label | Function |
| --- | --- | --- |
| 15:0 | Threshold | Threshold value. This is a unsigned 16 bit quantity, comparison is # errors > Threshold. |

The Routeword Parity Error Threshold controls the assertion of an error indication for routeword parity errors. When the number of routeword parity errors exceeds the value in this register, an error condition is signaled in the error counter status register and an interrupt may be generated.

| Bit | Label | Function |
| --- | --- | --- |
| 15:0 | Threshold | Threshold value. This is a unsigned 16 bit quantity, comparison is # errors > Threshold. |

The Routeword NF Error Threshold controls the assertion of an error indication for routeword NF errors. When the number of routeword NF errors exceeds the value in this register, an error condition is signaled in the Error Counter Status register and an interrupt may be generated.

| Bit | Label | Function |
| --- | --- | --- |
| 15:0 | Threshold | Threshold value. This is a unsigned 16 bit quantity, comparison is # errors > Threshold. |

Each checksum error counter reports a count of checksum error for a specific reconstructed data lane. If any checksum error exceeds the value programmed in the checksum error threshold, an error condition is generated and flagged in the main status register. These counters will not overflow, but will hold a value of all ones until reset. Counters are incremented if a checksum error occurs. Counters reset when it is read by software.

| Bit | Label | Function |
| --- | --- | --- |
| 15:0 | Error count | Gives number of checksum errors seen on this reconstruction lane since the last counter read. |

Each routeword error count reports a count of routeword errors for a specific input data lane. If any checksum error exceeds the value programmed in the Routeword Error Threshold, an error condition is generated and flagged in the Main Status register. These counters will not overflow, but will hold a value of all ones until reset. Counters are incremented if a routeword error occurs. Counters reset when read by software.

| Bit | Label | Function |
| --- | --- | --- |
| 15:0 | Error count | Counts the number of routeword errors on a given input lane. |

A lane not having a routeword is treated as a routeword of zero for comparison purposes.

The parity error counter register reports a count of parity errors for the incoming data. If the parity error counter exceeds the value programmed in the parity error threshold, an error condition is generated and flagged in the main status register. This counter will not overflow, but will hold a value of all ones until reset. This counter is incremented if a parity error occurs. Counters reset when read by software.

| Bit | Label | Function |
| --- | --- | --- |
| 15:0 | Error count | Number of parity errors seen since last counter read. |

The Routeword Parity Error Count register reports a count of routeword parity errors for the voted routeword data. If the Routeword Parity Error Count exceeds the value programmed in the Routeword Parity Error Threshold, an error condition is generated and flagged in the Error Counter Status register. This counter will not overflow, but will hold a value of all ones until reset. This counter is incremented if a routeword parity error occurs. Counters reset when read by software.

| Bit | Label | Function |
| --- | --- | --- |
| 15:0 | Error count | Number of routeword parity errors seen since last counter read. |

The routeword NF error count register reports a count of routeword NF errors for the voted routeword data. If the routeword NF error counter exceeds the value programmed in the routeword NF error threshold, an error condition is generated and flagged in the Error Counter Status register. This counter will not overflow, but will hold a value of all ones until reset. This counter is incremented if a routeword NF error occurs. Counters reset when read by software.

| Bit | Label | Function |
| --- | --- | --- |
| 15:0 | Error count | Number of routeword NF consistency errors seen since last counter read. |

The Unstriper maintains a single counter for all packets dropped. The only drop conditions which can occur in the Unstriper are due to FIFO full condition or incorrect checksum results. This counter is implemented as a 32-bit counter.

This counter counts the number of packets dropped due to FIFO full conditions.

| Bit | Label | Function |
| --- | --- | --- |
| 31:0 | Drop_counter | Gives the number of drops. Register resets on a read. Writes to the register are ignored. |

This counter counts the number of packets/cells dropped due to checksum failures.

| Bit | Label | Function |
| --- | --- | --- |
| 31:0 | Drop_counter | Gives the number of drops. Register resets on a read. Writes to the register are ignored. |

The debug registers are intended as debug aids.

The debug select register selects which lanes of data have error information visible in the other debug registers.

| Bit | Label | Function |
| --- | --- | --- |
| 31:8 | Unused | |
| 7:4 | Queue Select | Selects the synchronization queue to collect statistics on. Queue numbers follow the same convention used elsewhere in the Unstriper. 0–11 select the numbered input interface, 12 selects the parity interface. |
| 3:0 | CRC select | Selects which CRC to display among the 13 streams. Values 0-C are valid for this field. Values 0–11 correspond to the CRC with interface specified by the bit number substituted by the parity calculation. Value 12 corresponds to the value with no parity. |

This register reads the CRC byte selects by the CRC data select register. Data is read-only. Writing to this register does not affect the CRC calculation at all.

| Bit | Label | Function |
| --- | --- | --- |
| 15:0 | CRC data | Gives the data for the CRC function. |

The synch debug register is used to monitor the state of the synchronization logic. This register returns read data. Some of the fields are controlled by the Synch FIFO select register.

| Bit | Label | Function |
| --- | --- | --- |
| 31:24 | Min_depth | This register holds the minimum depth found of the FIFO selected by the FIFO Select Register. The minimum depth found since the last read of this register is stored and only updated if a lower minimum is found or the register has just been read. |
| 23:16 | Max_depth | This register holds the maximum depth found of the FIFO selected by the FIFO Select Register. The maximum depth found since the last read of this register is stored and only updated if a higher maximum is found or the register has just been read. |
| 15:8 | - clk_diff | The highest number of negative clocks corrected by the synchronizer logic. |
| 7:0 | Clk_diff | The clock speed difference register is used as a rough heartbeat for the synch logic. It counts the number of clocks in the last pause due to resynch. A negative value is represented by a '1' in the MSB of the register. |

The synch delay register controls configuration of the counters used for synchronization.

| Bit | Label | Function |
|---|---|---|
| 31:16 | Tick Length | Number of clock cycles before the master sequence counter is incremented. The tick length controls the time duration which one sequence value is transmitted. Dividing the programmed value by either 18 (OC48) or 5 (OC192) gives the maximum number of packets which can be transmitted. Due to FIFO limitations, this value should be programmed to a value less than or equal to 1024. |
| 15:0 | Pulse Delay | Number of clock cycles that the receiver waits before resetting the master sequence counter after receiving a sync pulse.. This value should be set to be greater than the round trip times + allowable clock drift to ensure the receiver has seen data from all the transmitters. |

The synchronizer status register will contain information pertaining to the status of various counts and errors in the receive synchronizer. All bits in this register are cleared on read.

| Bit | Label | Function |
|---|---|---|
| 13:0 | FIFO overflow | A bit is set to a one to indicate a FIFO overflow condition occurred. |

The Unstriper provides a FIFO which stores the fabric routewords and the memory controller routeword for terminated cells. The cell termination threshold controls the number of FIFO entries which generate an interrupt. Once the status bit is asserted, it will remain asserted until the FIFO is emptied.

| Bit | Label | Function |
|---|---|---|
| 31:7 | Unused | |
| 6:0 | Count value | If the number of fifo entries > count, the status indication will be set. |

The egress RW read register returns the value of the current egress routeword from the FIFO. Note that the FIFO advances on the read of the Error Syndrone register, so back-to-back reads of this register will return the same data.

| Bit | Label | Function |
|---|---|---|
| 31:24 | Input port | Gives the input port (OC48 port number) for the cell. |
| 23:0 | Mem_ctrl_rw | Memory controller connection number |

The Error Syndrome register returns the value of the error state assocaited with the current routeword pair. Note that the FIFO advances on the read of this register, so the FIFO effectively advances all three registers to the next entry on the read of this register.

| Bit | Label | Function |
|---|---|---|
| 31:6 | unused | |
| 5:2 | Fabric_id | Gives the fabric identifier of where the suspected error occurred. 0000–1011 indicate fabrics 0–11, 1100 indicates the parity fabric, 1110 is reserved, and 1111 indicates that no conclusive result was possible. |
| 1 | Data_err | 1 indicates error seen in data for the input channel indicates |
| 0 | Hdr_err | 1 indicates error seen in header for the input channel |

The Transceiver Error Status register as one bit for each Transceiver Error Counter register. When one of the error counters exceeds the threshold the corresponding bit in this register is set. A bit is cleared when the corresponding counter register is read.

| Bit | Label | Function |
|---|---|---|
| 31:14 | Unused | |
| 13:0 | Counter over threshold | Bit x is set if Transceiver Error Counter(x) > Transceiver Error Threshold. |

| Bit | Label | Function |
|---|---|---|
| 31:16 | Unused | |
| 15:0 | Threshold value | Value that when exceeded by a Transceiver Error Counter will cause that counter's bit in the Transceiver Error Status register to be set. |

The Transceiver Error Count Select register determines which of the 14 Gigabit Transceiver Error Count registers will be provide the value that is returned when the Transceiver Error Count register is read.

| Bit | Label | Function |
|---|---|---|
| 31:4 | Unused | |
| 3:0 | Counter select | Selects the Transceiver Error Count register that will be accessed when |

Each Gigabit Ethernet Transceiver has a counter that counts the number of times the status bits from that transceiver indicates that an error has occurred. When the Transceiver Error Count register is read the error count of the transceiver selected in the Transceiver Error Count Control register will be returned.

| Bit | Label | Function |
|---|---|---|
| 31:16 | Unused | |
| 15:0 | Count value | Number of times the status bits of the Gigabit Ethernet transceiver selected by the Transceiver Error Count Control register indicated an error since that last time this register was read or reset. |

1. The unstriper uses 3.3 volt LVTTL signaling for all but the CLOCK125 pin
2. The CLOCK125 pin uses 3.3 Volt LVDS signaling.

The following table gives the timing constraints used for timing analysis. Designs that meet these constraints should work across any respins. The columns have the following meanings:

| | |
|---|---|
| CLK | Gives the reference clock for the timing. All timing values are given in reference to the clock signal arriving at the associated clock pin on Unstriper. |
| Min_time | This gives the minimum amount of time between the clock signal and the output transition. This can be used to calculate hold time. |
| Max_time | This gives the maximum amount of time until an output signal is stable. |
| Output Load | Load used for max_time. Other loads can be used, greater loads increase time, smaller loads decrease time. |
| Drive | Type of drive book. |
| Comments | Any comments (primarily on the derivation of output load). |

| Pin | ClkMin Time[1] | Max Time | Output Load | Drive | Comments |
|---|---|---|---|---|---|
| TDO | TCK | | 10 pF | | |

The following table gives the input timing. The columns have the following meanings:

| | |
|---|---|
| CLK | Gives the reference clock for the timing. A value of N/A either means the signal is not speced for transition or that the signal is not assumed to asynchronous with respect to all input clocks. |
| Setup/hold | same thing they mean everywhere else. |
| Pin cap | Pin capacitance presented by the receiver or bidi. |
| Comments | Any comments (primarily on the derivation of output load). |

| Pin | Clk | Setup | Hold (ns) | 5V tol | Pin Cap | Comments |
|---|---|---|---|---|---|---|
| TRST | N/A | NA | NA | Y | 6.8 pF | Async. |
| RESET_L | N/A | NA | NA | Y | 6.8 pF | Async |

The chip was timed assuming the following arrival times for clocks:

| Clock | Clock | Supported Skew | Notes |
|---|---|---|---|
| AD_CLK | any | Any | AD_CLK is asynchronous with rest of chip. Unstriper supports speeds from 20 MHz to 33 MHz on AD_CLK. The speed limit on the AD clock is primarily I/O timing related, chip internals run up to 40. Any applications which desire above 33 MHz should talk to the design team. |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A switch of a network for switching data comprising:
a fabric for switching the data;
a connection mechanism connected to the fabric for providing data to and from the fabric;
a first port card which receives data at a first rate from the network or sends data at the first rate to the network, the first port card connected to the connection mechanism to send data to or receive the data from the fabric at a connection rate; and
a second port card which receives data at a second rate from the network or sends data at the second rate to the network, the second port card connected to the connection mechanism to send data to or receive data from the fabric at the connection rate, the second port card separating the data received at the second rate into streams of data that together equal the data received at the second port card that are sent concurrently at the connection rate to the fabric and combine the data streams received at the connection rate into data that is sent at the second rate to the network, the second port card maps the data received at the second rate onto the bus in 4 bit interleaved fashion, the connection rate equals the first rate and the second rate is equal to N times the first rate, where N is an integer equal to 4, and there are N streams.

2. A switch as described in claim 1 wherein the connection mechanism includes a backplane bus that connects the first port card and the second port card to the fabric.

3. A switch as described in claim 2 wherein the first port card has a first striper which takes the data it receives and sends it on the backplane bus as an OC48 data pipe to the fabric, and the second port card has a second striper which takes the data it receives and sends it as 4 OC48 data pipes to the fabric.

4. A switch as described in claim 3 wherein the first port card has a first unstriper which receives data from the fabric on an OC48 data pipe and the second port card has a second unstriper which receives data from the fabric on 4 OC48 data pipes and concatenates the 4 OC48 data pipes to form 1 wide data bus to send the data as OC192 data to the network.

5. A switch as described in claim 4 wherein the first and second striper stripe data they receive on a 48 bit basis to the fabric.

6. A switch as described in claim 5 wherein the first and second stripers stripe data so the data does not exceed a 12 bit boundary.

7. A switch as described in claim 6 wherein the fabric has an aggregator which receives data from the first and second stripers, and a separator which sends data from the fabric to the first unstriper and the second unstriper.

8. A method for switching data in a network comprising the steps of:
receiving data at a first rate from the network at a first port card of a switch;
receiving data at a second rate from the network at a second port card of the switch;
sending data from the first port card to a fabric of the switch through a connection mechanism of the switch at a connection rate;
separating the data received at the second rate at the second port card into streams of data that together equal the data received at the second port card; and
sending concurrently at the connection rate to the fabric from the second port card the stream of data along the connection mechanism by mapping with the second port card the data received at the second rate onto the bus in 4 bit interleaved fashion, the connection rate equals the first rate and the second rate is equal to N times the first rate, where N is an integer equal to 4, and there are N streams.

9. A method as described in claim 8 wherein the connection mechanism includes a backplane bus that connects the first port card and the second port card to the fabric.

10. A method as described in claim 9 wherein the first port card has a first striper and the second port card has a second striper, and wherein the sending data from the first port card step includes the step of sending the data on the backplane bus with the first striper as an OC482 data pipe to the fabric and the mapping step includes the step of sending the data received by the second striper as 4 OC48 data pipes on the backplane bus to the fabric.

11. A method as described in claim 10 wherein the first port card has a first unstriper and the second port card has a second unstriper, and including after the sending the data by the second striper step, there are the steps and of receiving data from the fabric on an OC48 data pipe at the first port card, receiving data from the fabric on 4 OC48 data pipes at the second port card, and concatenating the 4 OC48 data pipes to form 1 wide data bus to send the data as OC192 data to the network by the second port card.

12. A method as described in claim 11 wherein the first port card sending step includes the step of striping data with the first striper on a 48 bit basis to the fabric, and the second port card sending step includes the step of striping data with the second striper on a 48 bit basis to the fabric through the bus.

13. A method as described in claim 12 wherein the first striper sending step includes the step of striping data to the fabric through the bus so the data does not exceed a 12 bit boundary, and the second striper sending step includes the step of striping data to the fabric through the bus so the data does not exceed a 12 bit boundary.

14. A switch of a network for switching data comprising:
a plurality of fabrics for switching the data;
a connection mechanism connected to the fabrics for providing data to and from the fabrics;
a first port card which receives data at a first rate from the network or sends data at the first rate to the network, the first port card connected to the connection mechanism to send data as stripes to or receive the data as stripes from each of the fabrics at a connection rate; and
a second port card which receives data at a second rate from the network or sends data at the second rate to the network, the second port card connected to the connection mechanism to send data as stripes to or receive data as stripes from each of the fabrics at the connection rate, the second port card separating the data received at the second rate into the stripes of data that together equal the data received at the second port card that are sent concurrently as stripes at the connection rate to the fabrics and combine the data stripes received at the connection rate into data that is sent at the second rate to the network.

15. A switch as described in claim 14 wherein the connection rate equals the first rate and the second rate is equal to N times the first rate, where N is an integer greater than or equal to 2, and there are N stripes.

16. A switch as described in claim 15 wherein the connection mechanism includes a backplane bus that connects the first port card and the second port card to the fabrics.

17. A switch as described in claim 16 wherein the second port card maps the data received at the second rate onto the bus in interleaved fashion.

18. A system as described in claim 17 wherein the second port card maps the data received at the second rate onto the bus in 4 bit interleaved fashion, and N equals 4.

19. A method for switching data in a network comprising the steps of:
receiving data at a first rate from the network at a first port card of a switch;
receiving data at a second rate from the network at a second port card of the switch;
sending data as stripes from the first port card to each of a plurality of fabrics of the switch through a connection mechanism of the switch at a connection rate;
separating the data received at the second rate at the second port card into stripes of data that together equal the data received at the second port card; and
sending concurrently at the connection rate to each of the fabrics from the second port card the stripes of data along the connection mechanism.

20. A method as described in claim 19 wherein the connection rate equals the first rate and the second rate is equal to N times the first rate, where N is an integer greater than or equal to 2, and there are N stripes.

21. A method as described in claim 20 wherein the connection mechanism includes a backplane bus that connects the first port card and the second port card to the fabrics.

22. A method as described in claim 21 wherein the sending concurrently step includes the step of mapping with the second port card the data received at the second rate onto the bus in interleaved fashion.

23. A method as described in claim 22 wherein the mapping step includes the step of mapping with the second port card the data received at the second rate onto the bus in 4 bit interleaved fashion, and N equals 4.

* * * * *

UNITED STATES PATENT AND TRADEMARK OFFICE
CERTIFICATE OF CORRECTION

PATENT NO. : 7,009,963 B1
APPLICATION NO. : 09/686768
DATED : March 7, 2006
INVENTOR(S) : Schulz It is certified that error appears in the above-identified patent and that said Letters Patent is hereby corrected as shown below:

On the Title Page, item (54), in "Title", in Column 1, Line 2, delete "TRANSFER" and insert -- TRANSFERS --, therefor.

On the Title Page, under item "Notice", in Column 1, Line 3, delete "668" and insert -- 788 --, therefor.

In Column 1, Line 2, delete "TRANSFER" and insert -- TRANSFERS --, therefor.

In Column 13, Line 31, under "Fabric (bit)", delete "F3(0)" and insert -- F3(2) --, therefor.

In Column 33, Lines 62-63, delete "fashion 55 similar" and insert -- fashion similar --, therefor.

In Column 34, Line 14, delete "start 60 of" and insert -- start of --, therefor.

In Columns 41-42, Table above Line 45, delete "F0c01)" and insert -- F0c(1) --, therefor.
(with superscript 26 shown above both)

In Column 47, Line 4, under "Function", delete ""01 1"" and insert -- "011" --, therefor.

In Column 49, Line 3, under "Function", delete "Set to bit" and insert -- Set this bit --, therefor.

UNITED STATES PATENT AND TRADEMARK OFFICE
CERTIFICATE OF CORRECTION

PATENT NO. : 7,009,963 B1
APPLICATION NO. : 09/686768
DATED : March 7, 2006
INVENTOR(S) : Schulz It is certified that error appears in the above-identified patent and that said Letters Patent is hereby corrected as shown below:

In Column 51, Line 21, under "Label", delete "NE Error" and insert -- NF Error --, therefor.

In Column 51, Line 22, under "Function", delete "NE Error" and insert -- NF Error --, therefor.

Signed and Sealed this

Thirtieth Day of December, 2008

JON W. DUDAS
*Director of the United States Patent and Trademark Office*